United States Patent
Gupta et al.

(10) Patent No.: US 11,531,563 B2
(45) Date of Patent: Dec. 20, 2022

(54) TECHNOLOGY FOR OPTIMIZING HYBRID PROCESSOR UTILIZATION

(71) Applicant: Intel Corporation, Santa Clara, CA (US)

(72) Inventors: Monica Gupta, Hillsboro, OR (US); Eliezer Weissmann, Haifa (IL); Hisham Abu Salah, Majdal Shams (IL); Rajshree Arun Chabukswar, Sunnyvale, CA (US); Russell Jerome Fenger, Beaverton, OR (US); Eugene Gorbatov, Hillsboro, OR (US); Guruprasad Settuvalli, Hillsboro, OR (US); Balaji Masanamuthu Chinnathurai, Hillsboro, OR (US); Sumant Tapas, Hillsboro, OR (US); Meghana Gudaram, Hillsboro, OR (US); Raj Kumar Subramaniam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 16/912,770

(22) Filed: Jun. 26, 2020

(65) Prior Publication Data
US 2021/0406060 A1    Dec. 30, 2021

(51) Int. Cl.
*G06F 9/48* (2006.01)
*G06F 1/28* (2006.01)
*G06F 9/4401* (2018.01)

(52) U.S. Cl.
CPC ............. *G06F 9/485* (2013.01); *G06F 1/28* (2013.01); *G06F 9/4406* (2013.01)

(58) Field of Classification Search
CPC ........... G06F 9/485; G06F 1/28; G06F 9/4406
See application file for complete search history.

(56) References Cited

U.S. PATENT DOCUMENTS

| 10,545,793 B2 | 1/2020 | Ananthakrishnan et al. |
| 2006/0173665 A1* | 8/2006 | Arndt .................. G06F 11/3471 703/14 |

(Continued)

OTHER PUBLICATIONS

U.S. Appl. No. 16/547,767, filed Aug. 22, 2019, entitled "Technology For Dynamically Grouping Threads For Energy Efficiency," by Deepak Samuel Kirubakaran.
U.S. Appl. No. 16/728,617, filed Dec. 27, 2019, entitled "Apparatus and Method for Adaptively Scheduling Work on Heterogeneous Processing Resources," by Eliezer Weissmann.

(Continued)

*Primary Examiner* — Mohammed H Rehman
(74) *Attorney, Agent, or Firm* — Trop, Pruner & Hu, P.C.

(57) ABSTRACT

A data processing system comprises a hybrid processor comprising a big TPU and a small TPU. At least one of the TPUs comprises an LP of a processing core that supports SMT. The hybrid processor further comprises hardware feedback circuitry. A machine-readable medium in the data processing system comprises instructions which, when executed, enable an OS in the data processing system to collect (a) processor topology data from the hybrid processor and (b) hardware feedback for at least one of the TPUs from the hardware feedback circuitry. The instructions also enable the OS to respond to a determination that a thread is ready to be scheduled by utilizing (a) an OP setting for the ready thread, (b) the processor topology data, and (c) the hardware feedback to make a scheduling determination for the ready thread. Other embodiments are described and claimed.

21 Claims, 10 Drawing Sheets

(56) References Cited

U.S. PATENT DOCUMENTS

| | | | | |
|---|---|---|---|---|
| 2010/0146209 A1* | 6/2010 | Burger | ............... | G06F 12/0813 |
| | | | | 711/120 |
| 2010/0268912 A1* | 10/2010 | Conte | ............... | G06F 9/30101 |
| | | | | 712/20 |
| 2011/0067029 A1* | 3/2011 | Wolfe | ............... | G06F 9/505 |
| | | | | 712/228 |
| 2011/0126200 A1* | 5/2011 | Krieger | ............... | G06F 9/5033 |
| | | | | 718/102 |
| 2015/0081267 A1* | 3/2015 | Conroy | ............... | G05B 17/02 |
| | | | | 703/21 |
| 2016/0291672 A1 | 10/2016 | Sharda et al. | | |
| 2018/0203734 A1* | 7/2018 | Lowery | ............... | G06F 9/3889 |
| 2019/0042280 A1* | 2/2019 | Shanbhogue | ............... | G06F 1/3206 |
| 2019/0102227 A1 | 4/2019 | Ananthakrishnan et al. | | |
| 2019/0187992 A1* | 6/2019 | Ward | ............... | G06F 9/3889 |

OTHER PUBLICATIONS

U.S. Appl. No. 16/740,794, filed Jan. 13, 2020, entitled "Thread Scheduling Using Processing Engine Information," by Avinash N. Ananthakrishnan.

Wikipedia, "Hyper-threading," page last edited on Aug. 12, 2020, 8 pages total.

Intel Corporation, "Intel® Architecture Instruction Set Extensions and Future Features Programming Reference," Mar. 2020, pp. 1-58, 89-92 (Chapter 4) and 135-137 (65 total pages).

Intel Corporation, "Intel® 64 and IA-32 Architectures Software Developer's Manual, vol. 3A, System Programming Guide, Part 1," Sep. 2016, Chapter 8, 119 total pages.

European Patent Office, Office Action dated Nov. 10, 2021 in European Patent Application No. 21174883.5 (10 pages).

\* cited by examiner

US 11,531,563 B2

TECHNOLOGY FOR OPTIMIZING HYBRID PROCESSOR UTILIZATION

TECHNICAL FIELD

The present disclosure pertains in general to data processing systems and in particular to technology for optimizing processor utilization.

BACKGROUND

A processor in a conventional data processing system may include multiple thread processing units (TPUs) that enable the processor to execute multiple threads at once. For instance, a processor may include multiple single-threaded processing cores, with each processing core being capable of executing a different thread. Alternatively, a processor may include a single processing core that includes multiple logical processors (LPs) which enable the processor to perform simultaneous multithreading (SMT), with each LP being capable of executing a different thread. For purposes of this disclosure, a processing core that supports SMT may be referred to as a "multithreaded processing core." Alternatively, a processor may include multiple processing cores, each of which includes multiple LPs for performing SMT. For purposes of this disclosure, the terms "thread processing unit" and "TPU" refer to the features of a processor which enable the processor to execute a software thread. For instance, a single-threaded processing core may be referred to as a TPU, and each LP in a multithreaded processing core may be referred to as a TPU.

A conventional processor may have a homogenous topology, in that all of the TPUs in the processor are the same kind of TPU. For instance, all of the TPUs may be the same kind of single-threaded processing core, or all of the TPUs may be the same kind of LP in the same kind of multithreaded processing core.

A conventional operating system (OS) in a data processing system with multiple TPUs includes a thread manager to schedule threads on those TPUs. However, the algorithms that a conventional thread manager uses to make thread scheduling decisions may be designed for a processor with a homogenous topology.

Manufacturers are now developing processors with heterogenous topologies. For purposes of this disclosure, a processor with a "heterogenous topology" is a processor that includes at least two different types of processing cores. Accordingly, a heterogenous processor includes at least two different types of TPUs. A heterogenous processor may also be referred to as a "hybrid processor."

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
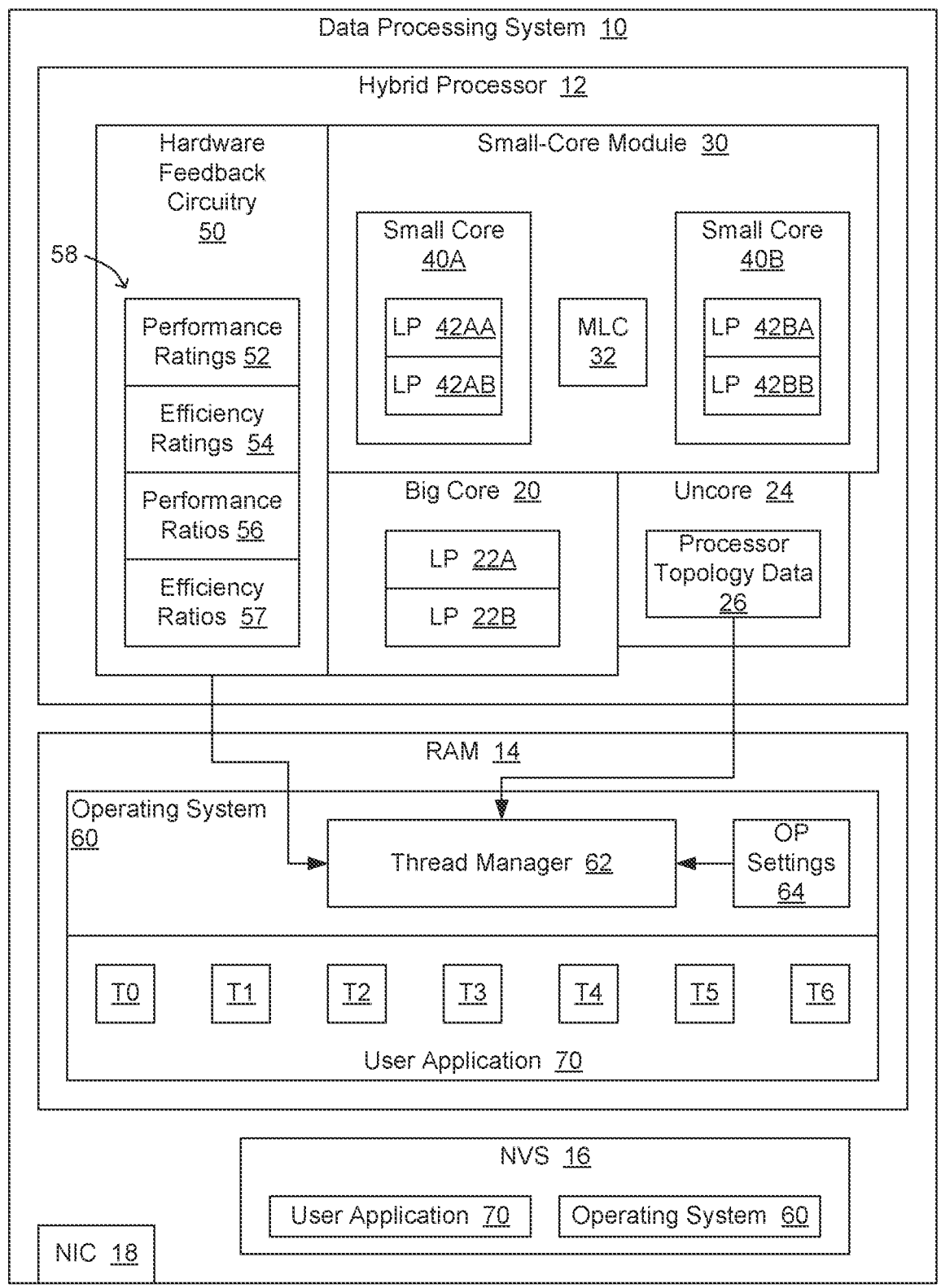
FIG. 1 is a block diagram of a hypothetical embodiment of a data processing system that features a hybrid processor and an OS with logic for optimizing thread management based on factors such as processor topology.

As indicated above, a hybrid processor (or heterogenous processor) is a processor that includes at least two different types of processing cores. For instance, a hybrid processor may include one single-threaded processing core along with one multithreaded processing core. Alternatively, a hybrid processor may include a first single-threaded processing core that supports a first range of power consumption and a second single-threaded processing core that supports a different range of power consumption, with the upper bound for one core being higher than the upper bound for the other core. Also, as described in greater detail below, the core which can be configured to consume more power may be referred to as a "big core," and the other core may be referred to as a "small core." Many other types of variations are also possible, including hybrid processors with multiple big cores that support SMT and multiple small cores that support SMT, hybrid processors with at least one processing-core module that includes multiple processing cores, etc. For purposes of this disclosure, a hybrid processor which includes at least one processing core that supports SMT may be referred to as a "hybrid SMT processor." Also, the terms "logical processor" and "LP" refer to the features within a multithreaded processing core that are dedicated to one thread, rather than being shared by multiple threads. For instance, each LP in a multithreaded processing core includes registers for storing the architectural state of the thread that is running on that LP, while the processing core also includes common execution resources (e.g., an arithmetic logic unit (ALU)) which are shared by the LPs. Also, terms like "processing-core module," "small-core module," etc. refer to a collection of processing cores within a processor that share resources such as mid-level cache (MLC), while each processing core includes independent execution resources such as ALUs.

For purposes of this disclosure, processing cores within a processor are considered to be of different kind or types if those processing cores differ with regard to characteristics such as (a) the range of power consumption supported by each processing core, (b) support or lack of support for SMT, (c) which resources (if any) are shared with other processing cores, (d) the number of sibling processing cores within a processing-core module, etc. Similarly, different LPs are considered to be of different kinds or types if those LPs differ with regard to characteristics such as residing in different types of processing cores. Accordingly, TPUs are considered to be of different kinds or types based on the same kinds of distinctions (e.g., different supported ranges of power consumption, etc.).

As described in greater detail below, the present disclosure involves an OS that is capable of detecting processor topology, and that is capable of optimizing thread management decisions, based at least in part on different characteristics associated with different TPUs within the processor topology. Such an OS may cause a data processing system with a hybrid processor to execute threads more effectively and/or more efficiently, relative to a conventional OS.

For instance, in one scenario, a thread manager is preparing to schedule a thread which prefers high performance or high quality of service (QOS) on a processor that has (a) a first core with one busy LP and one idle LP and (b) a second core with two idle LPs. As described in greater detail below, by considering processor topology and hardware feedback for each LP, the thread manager may determine that the idle LPs of the second core are not significantly more performant that the idle LP of the first core. Consequently, the thread manager may schedule the thread on the idle LP of the first core, to allow the second core to remain idle and save power. By contrast, a conventional thread manager might schedule the thread on the second core in an attempt to optimize performance, without recognizing that doing so will not actually result in an increase in performance. Consequently, the conventional thread manager may cause reduced efficiency without causing an increase in performance.

In accordance with the present teachings, it is not necessary to develop different versions of an OS to handle different types of hybrid processors. Instead, a single version may include logic for detecting processor topology, for analyzing hardware feedback for TPUs, for considering thread preferences, and for managing threads according to all of those factors.

FIG. 1 is a block diagram of a hypothetical embodiment of a data processing system 10 with a hybrid processor 12 and an OS 60 with logic for optimizing thread management based on factors such as processor topology. In the embodiment of FIG. 1, data processing system 10 also includes random access memory (RAM) 14, non-volatile storage (NVS) 16, and other components such as a network interface controller (NIC) 18 coupled to, or in communication with, hybrid processor 12. Hybrid processor 12 may be implemented as an integrated circuit or "chip" that is mounted to a substrate to form a package. Alternatively, a hybrid processor may be implemented as a package that contains more than one chip.

In the example of FIG. 1, hybrid processor 12 includes two different types of processing cores. As described in greater detail below, those two types are a "big core" type and a "small core" type. In particular, hybrid processor 12 includes a big core 20, as well as a small-core module 30 that includes a first small core 40A, a second small core 40B, and an MLC 32 that is shared by small cores 40A and 40B. In general, big cores are designed to provide for higher performance (e.g., more execution speed) relative to a small core in the same processor, and small cores are designed to provide for more efficiency (e.g., less power consumption) relative to a big core in the same processor. In the embodiment of FIG. 1, big core 20 supports a first range of power and frequency settings, and each of small cores 40A and 40B supports a second range of power and frequency settings, with the range for big core 20 comprising an upper bound that causes more power consumption than the upper bound of the range for small cores 40A and 40B.

For purposes of this disclosure, the upper bound of the power and frequency settings that are supported by a processing core may be referred to as the "maximum performance setting" for that processing core. And if a processing core only supports one power setting, that power setting constitutes the maximum performance setting. Also, for purposes of this disclosure, the term "big core" denotes a type of processing core that has a higher maximum performance setting than at least one other type of processing core in that processor. Similarly, the term "small core" denotes a type of processing core that has a lower maximum performance setting than at least one other type of processing core in that processor. Also, a maximum performance setting is referred to as "lower" or "higher" in relation to the amount of power consumption associated with that setting. Thus, a big core operating at its maximum performance setting consumes more power than a small core operating at its maximum performance setting. In the example of FIG. 1, big core 20 has a higher maximum performance setting than small core 40A and small core 40B.

Typically, a big core in a processor (or an LP in the big core) is capable of delivering higher performance (e.g., by running at a higher frequency and/or by delivering a higher number of instructions retired per cycle (IPC)) than a small core in the processor (or an LP in the small core). However, the small core (or an LP in the small core) is typically capable of delivering higher efficiency (e.g., by consuming less power). For purposes of this disclosure, an LP may be referred to as "big" or "small" based on whether that LP resides in a big core or a small core. Similarly, big single-threaded cores and big LPs may be referred to as "big TPUs," and small single-threaded cores and small LPs may be referred to as "small TPUs."

Referring again to FIG. 1, each processing core in hybrid processor 12 supports SMT. Accordingly, big core 20 includes a first logical processor (LP) 22A and a second LP 22B; small core 40A includes a first LP 42AA and a second LP 42AB; and small core 40B includes a first LP 42BA and a second LP 42BB. However, in other embodiments, hybrid processors may have different topologies. For instance, a processor may include a single big core and a single small core. Alternatively, a processor may include multiple small-core modules. Also, a small-core module may include more than two small cores. Also, one type of processing core may not support SMT. For instance, the big core may not support SMT, or the small core (or cores) may not support SMT. Also, a data processing system may include multiple processor packages, and one or more of those processor packages may feature a hybrid processor. Many other types of topologies may be used in other embodiments.

In the example of FIG. 1, hybrid processor 12 also includes hardware feedback circuitry 50 in communication with big core 20 and small-core module 30. As described in greater detail below, hardware feedback circuitry 50 measures the performance and efficiency of each TPU and provides corresponding hardware feedback 58 to OS 60, to enable thread manager 62 to determine and implement optimized thread scheduling configurations. As described in greater detail below, hardware feedback 58 may include performance ratings 52, efficiency ratings 54, performance ratios 56, and efficiency ratios 57.

Data processing system 10 also includes software in NVS 16 that may be copied into RAM 14 and executed on hybrid processor 12. That software includes an OS 60 and a user application 70. In one scenario, user application 70 runs in multiple threads T0-T6. OS 60 includes a thread manager 62 to handle operations such as thread scheduling and thread migration. The threads to be managed may include threads T0-T6, as well as threads from other applications, and threads from OS 60.

OS 60 may generate and maintain operating preference (OP) settings 64 for the threads. The OP setting for a thread reflects an operating preference for that thread, with regard to performance or efficiency. As described in greater detail below, OS 60 may generate the OP setting for a thread based on factors such whether it is to be a foreground or a background thread, the runtime of the thread, and the priority assigned to the thread by the OS or by the application to which the threads belong. Also, as described in greater detail below, thread manager 62 collects (a) processor topology data 26 from an uncore 24 in hybrid processor 12 and (b) hardware feedback 58 from hardware feedback circuitry 50. Thread manager 62 then uses processor topology data 26, hardware feedback 58, and OP settings 64 to manage the threads to be executed on hybrid processor 12. In particular, thread manager 62 uses the collected data to determine and implement optimized thread configurations for scheduling different threads on different TPUs, so as to optimize or enhance the efficiency and/or performance of data processing system 10. The thread management process may include, for instance, making decisions concerning which processing TPUs are to be used by which threads, and whether threads should be migrated from one TPU to another.

Figure 2:
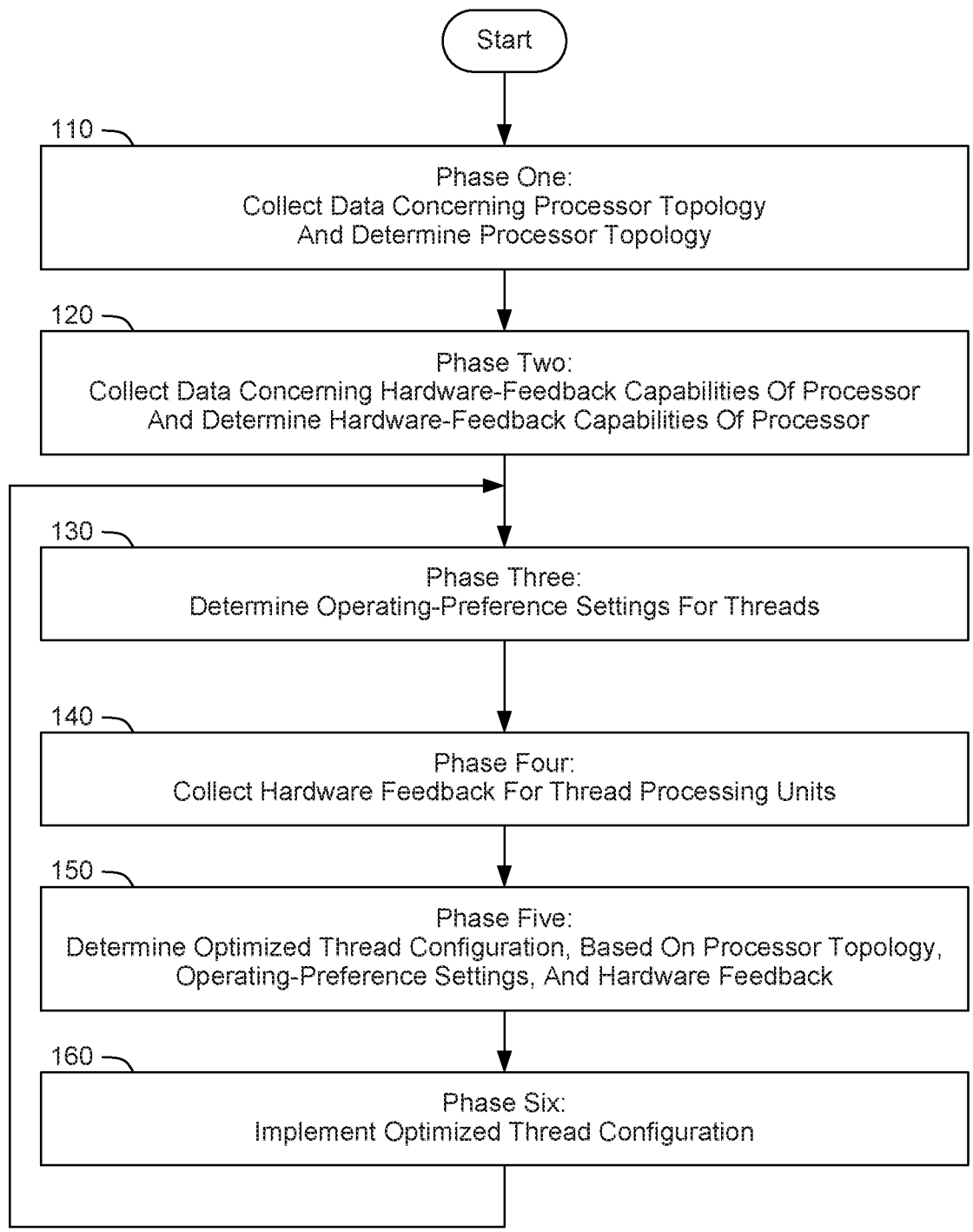
FIG. 2 presents a flowchart of an example embodiment of a process for managing threads in a data processing system with a hybrid processor.

FIG. 2 is a flowchart of an example embodiment of a process for managing threads in a data processing system that may include a hybrid processor. That process is described with regard to a scenario involving data processing system 10. In particular, OS 60 may perform the illustrated process to optimize thread scheduling for performance and/or efficiency.

In the illustrated scenario, the process for managing threads includes six main phases. In phase one, OS 60 collects data concerning the topology of hybrid processor 12, and OS 60 uses that data to determine the topology of hybrid processor 12, as shown at block 110. In phase two, OS 60 collects data from hybrid processor 12 concerning the types of hardware feedback that can be obtained from hybrid processor 12, and OS 60 uses that data to determine which types of hardware feedback will be obtained from hybrid processor 12, as shown at block 120. In phase three, thread manager 62 determines an OP setting for each thread, as shown at block 130. In phase four, thread manager 62 collects hardware feedback 58 for the TPUs in hybrid processor 12, as shown at block 140. In phase five, thread manager 62 uses one or more predetermined algorithms to determine an optimized thread configuration, based on the collected hardware feedback 58 and other factors such as the processor topology and the operating preferences for the threads, as shown at block 150. In phase six, thread manager 62 implements the optimized thread configuration, as shown at block 160.

Referring again to block 110, OS 60 may use architectural features of hybrid processor 12 to obtain the data concerning the topology of hybrid processor 12 from hybrid processor 12. For instance, hybrid processor 12 may support a processor identifier (ID) instruction that OS 60 may execute to obtain a processor ID for each TPU in processor 12, and those processor IDs may be structured in a way that reflects the topology of processor 12. Accordingly, OS 60 may analyze those processor IDs to determine the topology of hybrid processor 12.

For instance, the processor ID instruction may operate like the instruction referred to as a "CPUID instruction" in Volume 3A (System Programming Guide, Part 1) of the September 2016 version of the Intel® 64 and IA-32 Architectures Software Developer's Manual (SDM). And when OS 60 uses that instruction, OS 60 may obtain processor IDs that are structured like the Advanced Programmable Interrupt Controller (APIC) ID described in the SDM. For instance, as indicated in Section 8.4.3 of the SDM, in one embodiment, "[e]ach logical processor is assigned a unique APIC ID, based on system topology," with that unique ID being "a 32-bit value if the processor supports CPUID leaf 0BH." And as stated in Section 8.4.5 of the SDM, a "unique APIC ID is assigned to a logical processor during power up. This APIC ID is reported by CPUID.0BH:EDX[31:0] as a 32-bit value. Use the 32-bit APIC ID and CPUID leaf 0BH to determine the topological relationship between logical processors if the processor supports CPUID leaf 0BH." Section 8.4.5 also explains that "[b]its in the 32-bit x2APIC ID can be extracted into sub-fields using CPUID leaf 0BH parameters." For instance, a processor ID may include multiple fields to reflect the location of the associated TPU within the topology of the processor.

For example, as indicated in Section 8.9.1 of the SDM, a processor ID may include fields such as a cluster field (to identify a group of processor packages in a data processing system with multiple processor packages), a package field (to identify a particular processor package), a core field (to identify a particular processing core), and an SMT field (to identify a particular LP), with the values in those fields reflecting the hierarchical mapping of the TPUs. Accordingly, OS 60 may use processor IDs (and related data) to determine aspects of processor topology such (a) as whether a processor is a hybrid processor, (b) whether a processor includes multiple processing-core modules and if so which processing cores reside in which modules, (c) which TPUs (if any) are LPs, (d) which LPs reside in the same processing core (i.e., which are "siblings"), etc.

Referring again to block 120, OS 60 may use architectural features of hybrid processor 12 to detect which hardware technologies are available to provide hardware feedback. For instance, hybrid processor 12 may report that it can provide a performance rating and an efficiency rating for each TPU. For example, in one embodiment, a processor may report that it supports features such as those provided by the "Hardware Feedback Interface" that is described in Chapter 4 of the March 2020 version of the *Intel® Architecture Instruction Set Extensions and Future Features Programming Reference* (the "Future Features Programming Reference"). Accordingly, the performance rating may be a numeric value to specify the relative performance level of a particular TPU, with higher values denoting higher performance (e.g., like the "performance capability" field described in the Future Features Programming Reference). Similarly, the efficiency rating may be a numeric value to specify the relative efficiency level of a particular TPU, with higher values denoting higher efficiency (e.g., like the "energy efficiency capability" field described in the Future Features Programming Reference). For purposes of this disclosure, hardware feedback which includes a performance rating for each TPU and/or an efficiency rating for each TPU may be referred to as "hardware guided scheduling (HGS) feedback."

In addition, hybrid processor 12 may report that it can provide a set of performance ratios and a set of efficiency ratios for each TPU. The set of performance ratios for a TPU indicates how the performance rating for that TPU compares to the performance rating for each other TPU. Similarly, the set of efficiency ratios for a TPU indicates how the efficiency rating for that TPU compares to the efficiency rating for each other TPU. Hardware feedback circuitry 50 may generate each ratio in the set of performance ratios for a TPU by dividing the performance rating for that TPU by the performance rating for one of the other TPUs. Similarly, hardware feedback circuitry 50 may generate each ratio in the set of efficiency ratios for a TPU by dividing the efficiency rating for that TPU by the efficiency rating for one of the other TPUs. For purposes of this disclosure, hardware feedback which includes a set of performance ratios for each TPU and/or a set of efficiency ratios for each TPU may be referred to as "enhanced HGS feedback." By obtaining enhanced HGS feedback from hardware feedback circuitry 50, thread manager 62 may easily determine which TPUs are more efficient than a given TPU, and how much more efficient, and which TPU are more performant than a given TPU, and how much more performant.

Referring again to block 130, the process for determining the OP settings for the threads may include detecting or determining the QOS needs or preferences of each thread. For instance, for each thread, OS 60 may determine whether the thread should be set with a preference for performance or a preference for energy efficiency. OS 60 may make such determinations based on one or more attributes of the thread, such as (a) whether the thread is to be executed as a foreground or a background thread, (b) the expected and/or cumulative runtime of the thread, (c) the priority assigned to the thread by the OS or by an application to which the thread belongs, etc. For purposes of this disclosure, a thread with a preference for performance or QOS may be referred to as an "important thread," and a thread with a preference for efficiency may be referred to as an "unimportant thread."

Referring again to block 150, example embodiments of algorithms to be used by thread manager 62 to determine an optimized thread configuration are described below in connection with FIG. 3. Such algorithms are also described in the following tables. According to these algorithms, thread manager 62 may consider factors such as processor topology, TPU hardware feedback, and thread policy. The thread policy for a thread may be based on factors such as the priority of the thread, whether the thread is to run in the foreground or the background, and the elapsed runtime of the thread. Also, the thread policy may indicate whether the thread has a preference for performance or a preference for efficiency. OS 60 may record the thread policy as the OP setting for the thread. Thread manager may apply these algorithms in response to a thread becoming ready to run, in response to a TPU going idle, or at quantum end, where quantum end refers to the end of a predetermined time period for execution of a thread. For instance, thread manager 62 may periodically consider whether a running thread should be moved from the current TPU to a different TPU.

In particular, Table 1 describes thread scheduling algorithms that thread manager 62 may use when a thread becomes ready to run or at quantum end. As illustrated with the column heading, thread manager 62 may determine which algorithm to be used based on the processor topology of the data processing system and the OP setting for the thread to be scheduled.

TABLE 1

Thread Scheduling Algorithms:

| | Processor Topology | Thread Operating Preference for Performance | Thread Operating Preference for Efficiency |
|---|---|---|---|
| A. | One or more Big Cores with SMT, and one or more Small Cores with SMT. | If a core has all LPs idle and at least one of those LPs is performant, then schedule the thread on that performant LP. Else, schedule the thread on the most performant idle LP. If a significantly more performant LP subsequently goes idle, then migrate the thread to that LP. | If an LP is idle, efficient, and has unimportant threads on all sibling LPs, then schedule the thread on that idle LP. Else, schedule the thread on the most efficient idle LP. |
| B. | One or more Big Cores with SMT; and multiple Modules, each containing multiple Small Cores with or without SMT. | If the thread is related to (e.g., shares data with) a thread on a module with a performant idle TPU, then schedule the thread on that performant idle TPU to reduce cache access misses and/or latency. Else, if a module has all TPUs idle and at least one of those TPUs is performant, then schedule the thread on a performant TPU in that module. Else, schedule the thread on a performant TPU on the module with the most TPUs idle. | If a TPU is idle in a module that is only running unimportant threads, then schedule the thread on that TPU to reduce impact on important threads. |
| C. | One or more Big Cores with SMT; multiple Modules, each containing multiple Small Cores; and Enhanced HGS Feedback | Determine the most performant TPU (that is not running a more important thread), based on the performance ratios. If the most performant TPU is idle, then schedule the thread on that TPU. Else, if that TPU is available for preemption, then preempt the existing thread on that TPU. | Select the most efficient idle TPU, based on the efficiency ratios. |

Table 2 describes thread migration algorithms that thread manager 62 may use when a TPU goes idle, to determine whether a running thread should be moved to the idle TPU for higher performance and/or higher efficiency.

TABLE 2

Thread Migration Algorithms:

| | Processor Topology | Migrating for Performance | Migrating for Efficiency |
|---|---|---|---|
| A. | One or more Big Cores without SMT, and one Module with multiple Small Cores with or without SMT. | If the newly idle TPU is significantly more performant than any TPUs running important threads, then either (a) migrate the thread from the least performant TPU to the idle TPU, or (b) migrate the most important thread on a less performant TPU to the idle TPU. | If the newly idle TPU is significantly more efficient than any TPU running an unimportant thread, then either (a) migrate the unimportant thread on the least efficient TPU to the idle TPU, or (b) migrate the least important thread to the idle TPU. |
| B. | One or more Big Cores with SMT, and one Module with multiple Small Cores with or without SMT. | If the newly idle TPU has a sibling running an unimportant thread, and if a different (third) TPU is (a) running an important thread and is (b) less performant than the idle TPU, then migrate the important thread to the sibling of the idle TPU, and migrate the unimportant thread from that sibling TPU to the third TPU.<br>If (a) the newly idle TPU resides in a module, (b) all other TPUs in that module are idle, (c) an important thread is running on a core with SMT, and (d) that core includes at least one TPU that is not idle, then migrate the important thread to a TPU in the module with all idle TPUs. | If (a) the newly idle TPU has a busy sibling running an unimportant thread, (b) a different (third) TPU is running an unimportant thread, and (c) the third TPU is significantly less efficient than the newly idle TPU, then migrate the unimportant thread from the third TPU to the idle TPU. |
| C. | One or more Big Cores with SMT; and multiple Modules, each with multiple Small Cores with or without SMT. | As with row B above, if (a) the newly idle TPU resides in a module, (b) all other TPUs in that module are idle, (c) an important thread is running on a core with SMT, and (d) that core includes at least one TPU that is not idle, then migrate the important thread to a TPU in the module with all idle TPUs. However, do not migrate a thread if (a) the thread is related to another thread (e.g., to share data) and (b) the related threads are running in the same module. | If (a) the newly idle TPU resides in a module, (b) all other TPUs in that module are idle, (c) there is no important thread running in a module with unimportant threads, then do not migrate any unimportant threads to the module with all TPUs idle. |

Table 3 describes thread preemption algorithms that thread manager 62 may use when a thread becomes ready for scheduling, to determine whether the ready thread should be scheduled on an idle TPU, should preempt a running thread, or should be sent to a ready queue (e.g., the ready queue for the most performant core or TPU) to be scheduled later.

TABLE 3

Thread Preemption Algorithms:

| | Processor Topology | Preempting for Performance | Preempting for Efficiency |
|---|---|---|---|
| A. | One or more Big Cores without SMT, and one Module with multiple Small Cores with or without SMT. | If (a) no Big Core is idle and (b) a Big Core is running a less important thread, then preempt the less important thread by stopping the less important thread and scheduling the ready thread in its place.<br>If there are multiple preemption candidates, preempt the thread on the Big Core that is (a) most performant and (b) available for preemption. | If (a) no Small TPU is idle and (b) any Small TPU is running a less important thread, then preempt the least important thread on a Small TPU by stopping that thread and scheduling the ready thread in its place. |

TABLE 3-continued

Thread Preemption Algorithms:

| Processor Topology | Preempting for Performance | Preempting for Efficiency |
|---|---|---|
| B. One or more Big Cores with or without SMT, and one Module with multiple Small Cores with or without SMT. | If a Big Core without SMT is running a less important thread, preempt that thread with the ready thread.<br>Else, if (a) a Big Core with SMT has only one LP busy and (b) the ready thread is more important that the thread on that LP, then preempt the less important thread with the ready thread.<br>Else, if a Small Core without SMT is running a less important thread, then preempt that thread.<br>Else, if (a) a Small Core with SMT has only one LP busy, and (b) the ready thread is more important than the thread on that LP, then preempt the less important thread with the ready thread. | Like for Row A above, if (a) no Small TPU is idle and (b) any Small TPU is running a less important thread, then preempt the least important thread on a Small TPU. |
| C. One or more Big Cores with SMT, and multiple Modules with multiple Small Cores with or without SMT. | If the algorithm for row B above results in multiple Small TPUs as potential choices for preemption, then select a Small TPU from the module with the greatest number of Small TPUs idle as the preemption target. | Like for Row A above, if (a) no Small TPU is idle and (b) any Small TPU is running a less important thread, then preempt the least important thread on a Small TPU. |

Thread manager 62 may also use one or more algorithms to implement policies for preventing some threads from monopolizing resources to the detriment of other threads. Such policies may be referred to as "fairshare policies." For instance, when the processor topology includes a most performant TPU, thread manager 62 may implement a fairshare policy to give all important threads a better chance of getting some time on the most performant TPU. To do so, thread manager 62 may track the amount of time that each important thread spends on less performant TPUs, and when that amount of time exceeds a particular threshold for a particular thread, thread manager 62 schedules that thread on the most performant TPU the next time that TPU is available. In addition, thread manager 62 may provide for different classes of important threads, with threads in the most important class having a shorter threshold, and threads in less important classes having longer thresholds before getting the next share on the most performant TPU.

Figure 3A:
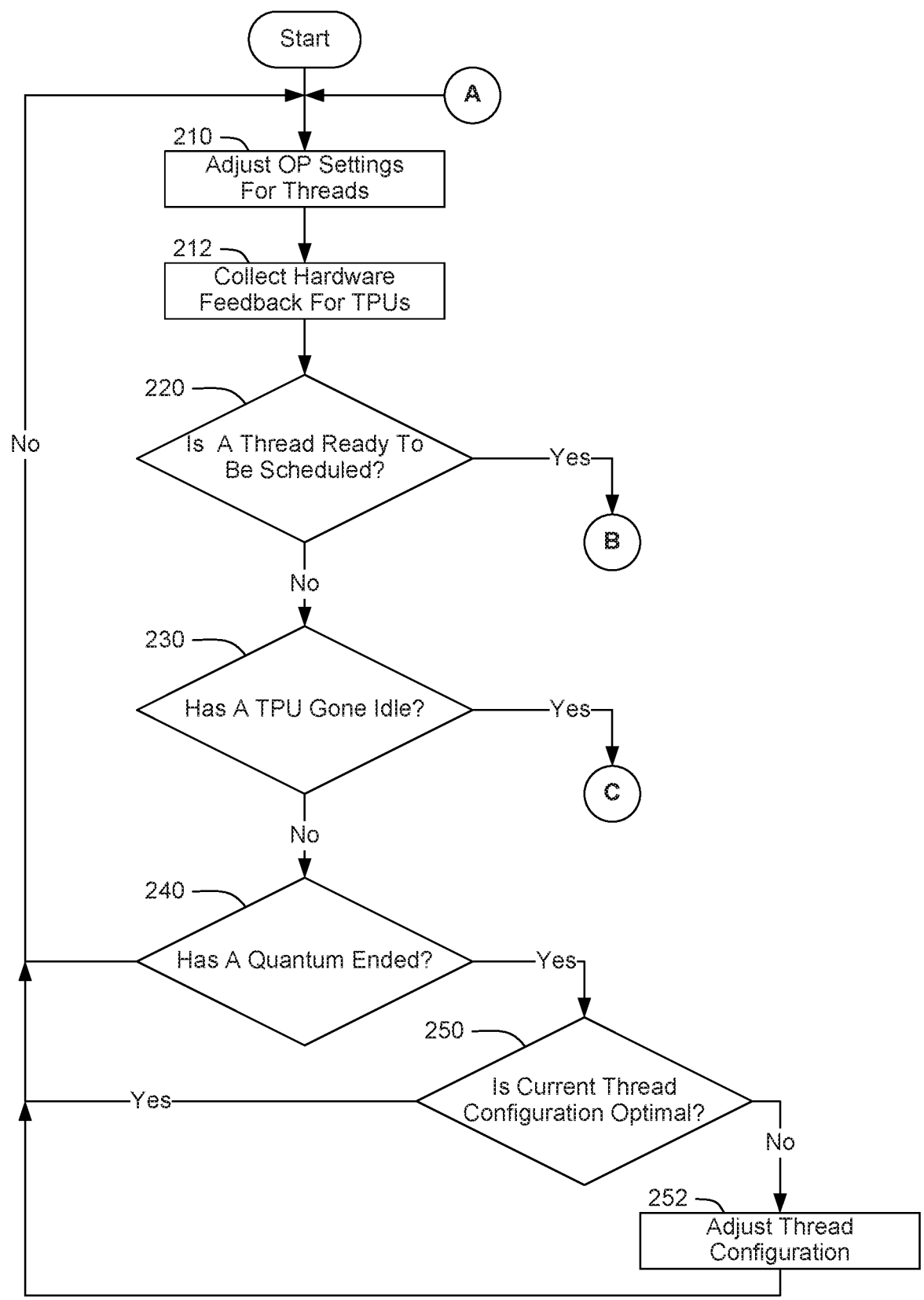
FIGS. 3A-3C present a flowchart with more details for parts of the example process illustrated in FIG. 2.
Figure 3B:
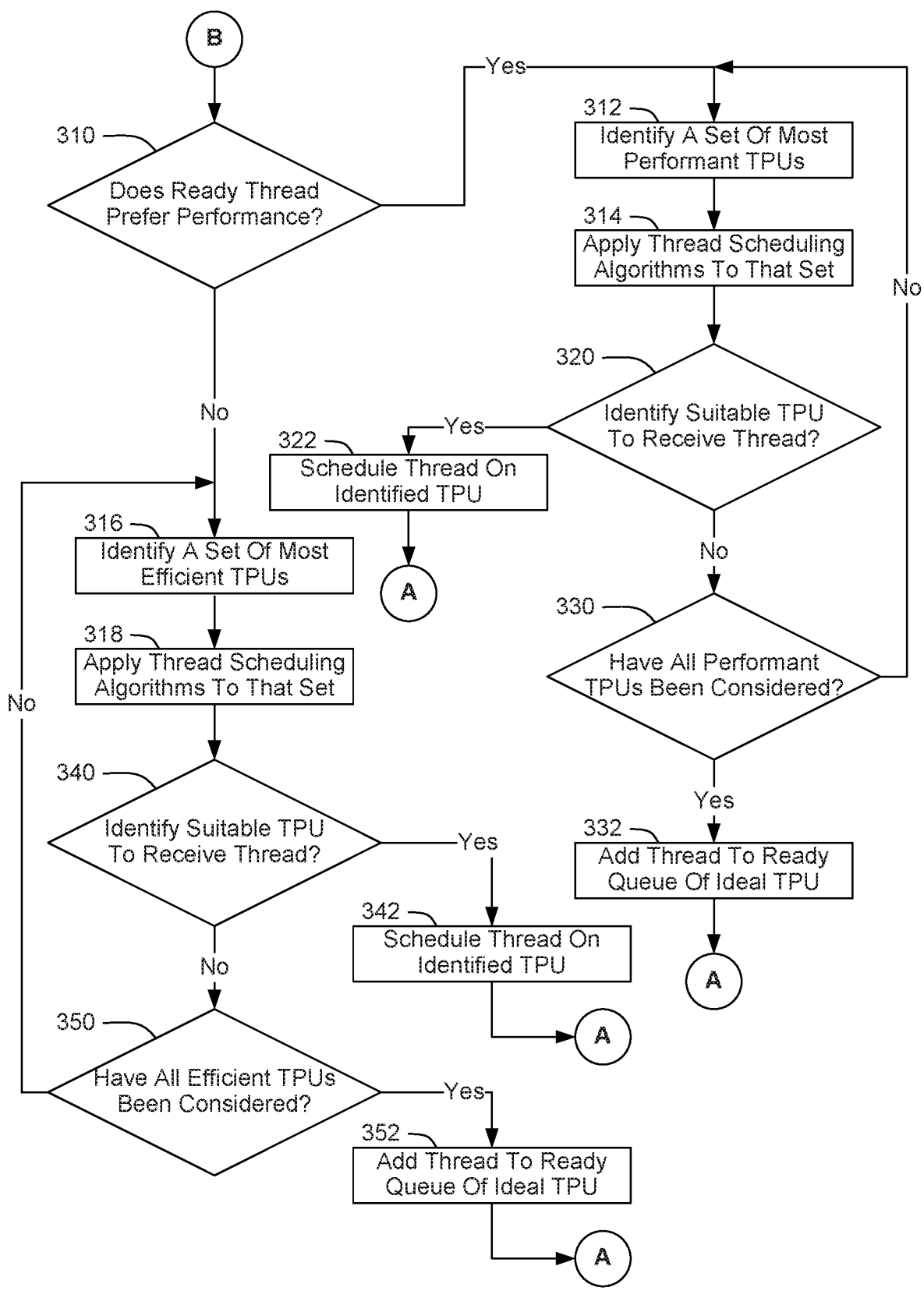
Figure 3C:
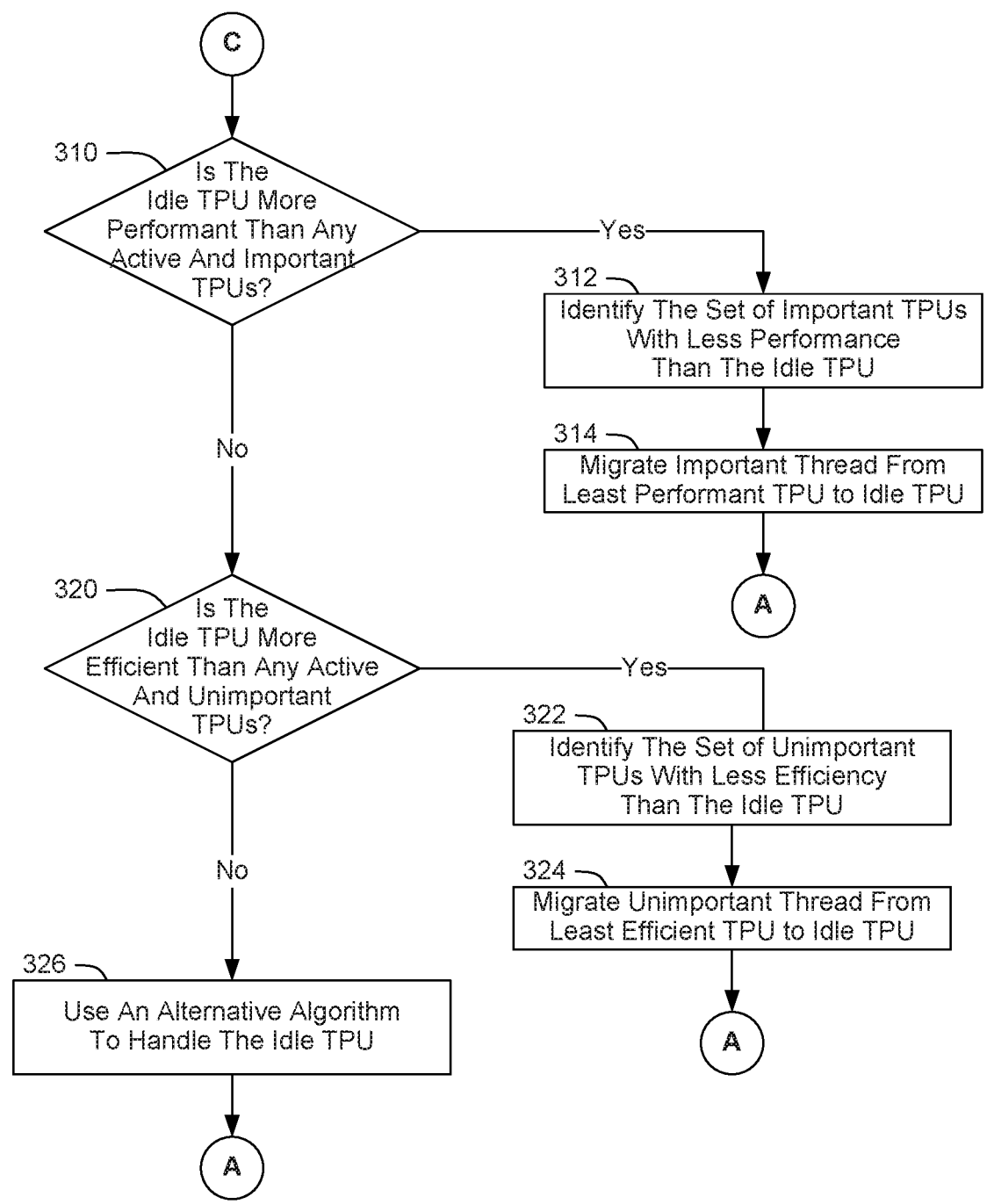

FIGS. 3A through 3C present a flowchart with more details for phases three through six of the example process illustrated in FIG. 2. The process of FIG. 3 may start with OS 60 adjusting OP settings for threads, if necessary, as shown at block 210, and collecting hardware feedback 58 from hardware feedback circuitry 50, as shown at block 212. Those operations may also correspond to phases three and four of FIG. 2. The remaining operations in FIGS. 3A through 3C may correspond to phases five and six of FIG. 2.

In particular, thread manager 62 may determine whether a thread is ready to be scheduled, as shown at block 220. If no thread is ready to be schedule, thread manager 62 may determine whether a TPU has gone idle, as shown at block 230. If no TPU has gone idle, thread manager may determine whether a quantum has ended, as shown at block 240. As indicated above, thread manager 62 may determine that a quantum has ended in response to expiration of a predetermined amount of time. If no quantum has ended, the process may return to block 210, with OS 60 adjusting OP settings if necessary, collecting fresh hardware feedback 58, etc., as indicated above.

However, referring again to block 220, if a thread is ready to be scheduled, the process may pass through page connector B to FIG. 3B, and thread manager 62 may then determine whether the thread has a preference for performance or a preference for efficiency, as shown at block 310. As shown at block 312, if the thread has a preference for performance, thread manager 62 may then identify a set of most performant TPUs, based on hardware feedback 58. In other words, from thread manager 62 may sort the TPUs into sets, with each set including TPUs with similar performance rating or ratios, and thread manager 62 may then select the set that contains the TPUs with the highest performance ratings or ratios.

As shown at block 314, thread manager 62 may then apply the predetermined thread scheduling algorithms to the TPUs in that set for the ready thread. As indicated above, those algorithms consider the processor topology, the OP settings for the ready thread, and the hardware feedback for the TPUs to determine an optimized thread configuration. In one embodiment, thread manager 62 uses the thread scheduling algorithms described above with regard to Table 1. As shown at block 320, thread manager 62 then determines whether those algorithms have identified a suitable TPU for the ready thread. If so, thread manager 62 schedules the ready thread on that TPU, as shown at block 322.

Otherwise, thread manager 62 determines whether there are any other sets of processors left to consider, as shown at block 330. If so, the process returns to block 312 with thread manager 62 selecting the next most performant set of processors. Thread manager 62 then applies the predetermined thread scheduling algorithms to the TPUs in that set, as indicated above. If thread manager 62 eventually finds a suitable TPU in one of the sets, thread manager 62 schedules the ready thread on that TPU. However, as shown at block 332, if thread manager 62 considers all sets of TPUs without finding a suitable TPU for the ready thread, then thread manager 62 adds the ready thread to the ready queue for the ideal (e.g., the most performant) TPU. The process may then return to FIG. 3A via page connector A.

However, referring again to block 310 of FIG. 3B, if the ready thread has a preference for efficiency, thread manager 62 may then identify a set of most efficient TPUs, based on hardware feedback 58, as shown at block 316. In other words, from thread manager 62 may sort the TPUs into sets, with each set including TPUs with similar performance rating or ratios, and thread manager 62 may then select the set that contains the TPUs with the highest efficiency ratings or ratios.

As shown at block 318, thread manager 62 may then apply the predetermined thread scheduling algorithms to the TPUs in that set for the ready thread. As indicated above, those algorithms consider the processor topology, the OP settings for the ready thread, and the hardware feedback for the TPUs to determine an optimized thread configuration. In one embodiment, thread manager 62 uses the thread scheduling algorithms described above with regard to Table 1. As shown at block 340, thread manager 62 then determines whether those algorithms have identified a suitable TPU for the ready thread. If so, thread manager 62 schedules the ready thread on that TPU, as shown at block 342.

Otherwise, thread manager 62 determines whether there are any other sets of processors left to consider, as shown at block 350. If so, the process returns to block 316 with thread manager 62 selecting the next most efficient set of processors. Thread manager 62 then applies the predetermined thread scheduling algorithms to the TPUs in that set, as indicated above. If thread manager 62 eventually finds a suitable TPU in one of the sets, thread manager 62 schedules the ready thread on that TPU. However, as shown at block 352, if thread manager 62 considers all sets of TPUs without finding a suitable TPU for the ready thread, then thread manager 62 adds the ready thread to the ready queue for the ideal (e.g., the most efficient) TPU. The process may then return to FIG. 3A via page connector A.

In addition or alternatively, thread manager 62 may use preemption in connection with scheduling a ready thread. For instance, thread manager 62 may use one or more of the algorithms described in Table 3 to decide whether to schedule the ready thread on an idle processor or to preempt an active thread with the ready thread.

Referring again to block 230 of FIG. 3A, when thread manager 62 detects that a TPU has gone idle, the process may pass through page connect C to FIG. 3C. As shown at block 310, thread manager 62 may then determine whether any TPUs are running an important thread while having more performance than the idle TPU. For purposes of this disclosure, a TPU that is running an important thread may be referred to as an "important TPU," while a TPU that is running an unimportant thread may be referred to as an "unimportant TPU." If the idle TPU is more performant than any active and important TPUs, thread manager 62 identifies the set of important TPUs with less performance than the idle TPU, as shown at block 312. As shown at block 314, thread manager 62 then migrates the important thread from the least performant of those TPUs to the idle TPU. The process for handling an idle TPU may then end, and the process for managing threads may return to FIG. 3A via page connector A.

However, if the idle TPU is not more performant than any active and important TPUs, thread manager 62 determines whether the idle TPU is more efficient than any active and unimportant TPUs, as shown at block 320. If the idle TPU is more efficient than any active and unimportant TPUs, thread manager 62 identifies the set of unimportant TPUs with less efficient than the idle TPU, as shown at block 322. As shown at block 324, thread manager 62 then migrates the unimportant thread from the least efficient of those TPUs to the idle TPU. The process for handling an idle TPU may then end, and the process for managing threads may return to FIG. 3A via page connector A.

However, if the idle TPU is not more efficient than any active and unimportant TPUs, thread manager 62 may use an alternative algorithm to handle the idle TPU, as shown at block 326. For instance, thread manager 62 may use one or more of the algorithms described in Table 2.

The process for handling an idle TPU may then end, and the process may return to FIG. 3A via page connector A.

Referring again to block 240 of FIG. 3A, if a quantum has ended, thread manager 62 may respond by analyzing the current thread configuration to determine whether that configuration is substantially optimal. If the current thread configuration is substantially optimal, the process may return to block 210. However, if the current thread configuration is not substantially optimal, thread manager 62 may adjust the thread configuration, as shown at block 252. For instance, thread manager 62 may consider whether any thread scheduling algorithms, thread migration algorithms, fairshare policies, etc. or other policies would result in a thread configuration that is, in aggregate, more performant for important threads and/or more efficient for unimportant threads.

For instance, at quantum end, thread manager 62 may determine whether there is an important thread on a TPU that is less performant than any idle TPUs. And if a more performant TPU is idle, thread manager 62 may migrate the thread to that more performant TPU. For instance, such an operation may result in migration of a thread from a TPU with siblings to a TPU without siblings.

Thus, as has been described, an OS includes a thread manager that considers processor topology, TPU hardware feedback, and thread preferences when scheduling and managing threads on a data processing system, to optimize the thread configuration for performance and/or efficiency.

ADDITIONAL EMBODIMENTS

FIGS. 4-8 are block diagrams of exemplary computer architectures. The same or similar elements in FIGS. 4-8 bear like reference numerals. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
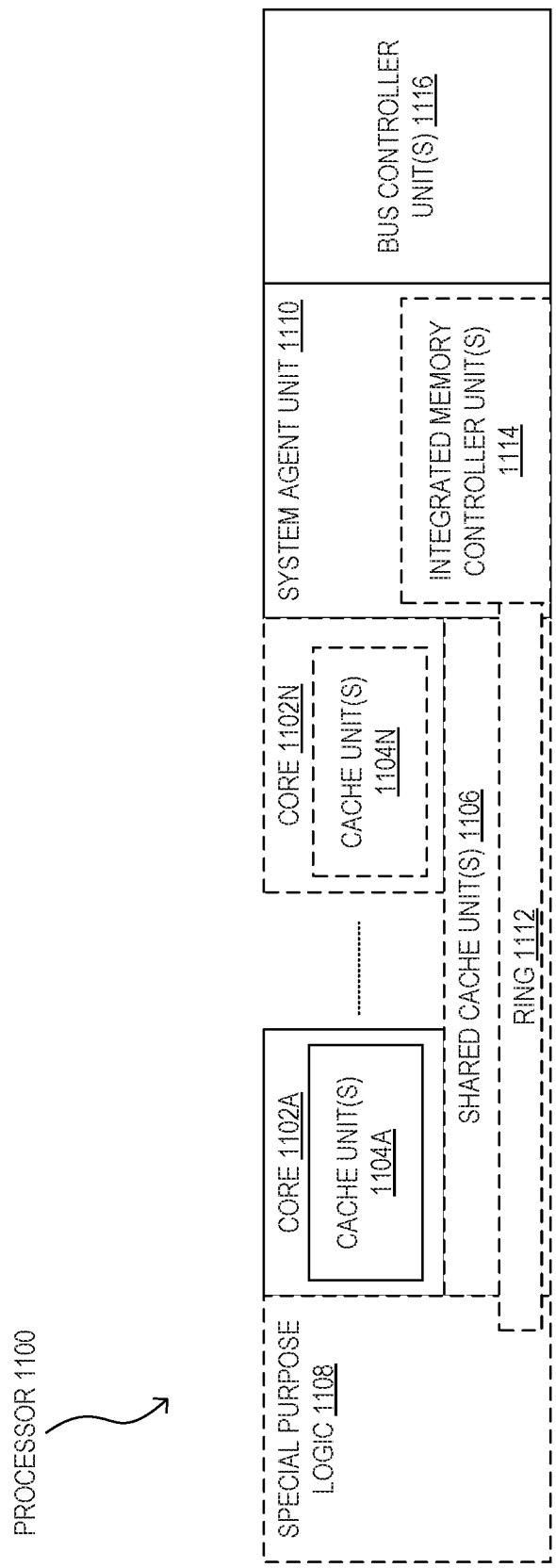
FIG. 4 is a block diagram of a processor that may have more than one core, may have an integrated memory controller, and may have integrated graphics according to embodiments of the invention.

FIG. 4 is a block diagram of a processor 1100 that may have more than one core, may have an integrated memory controller, and may have integrated graphics according to embodiments of the invention. The solid lined boxes in FIG. 4 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) in the system agent unit 1110, and special purpose logic 1108.

Thus, different implementations of the processor 1100 may include: 1) a central processing unit (CPU) with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, a compression engine, a graphics processing unit (GPU), a general purpose GPU (GPGPU), a high-throughput many integrated core (MIC) coprocessor (including 30 or more cores), an embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache units 1104A-N within the cores, a set or one or more shared cache units 1106, and external memory (not shown) coupled to the set of integrated memory controller units 1114. The set of shared cache units 1106 may include one or more mid-level caches, such as L2, level 3 (L3), level 4 (L4), or other levels of cache, a last level cache (LLC), and/or combinations thereof. While in one embodiment a ring based interconnect unit 1112 interconnects the special purpose logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102 A-N.

The system agent unit 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set. Such cores 1102A-N may convert certain memory access instructions into subline memory access instructions as described herein.

Figure 5:
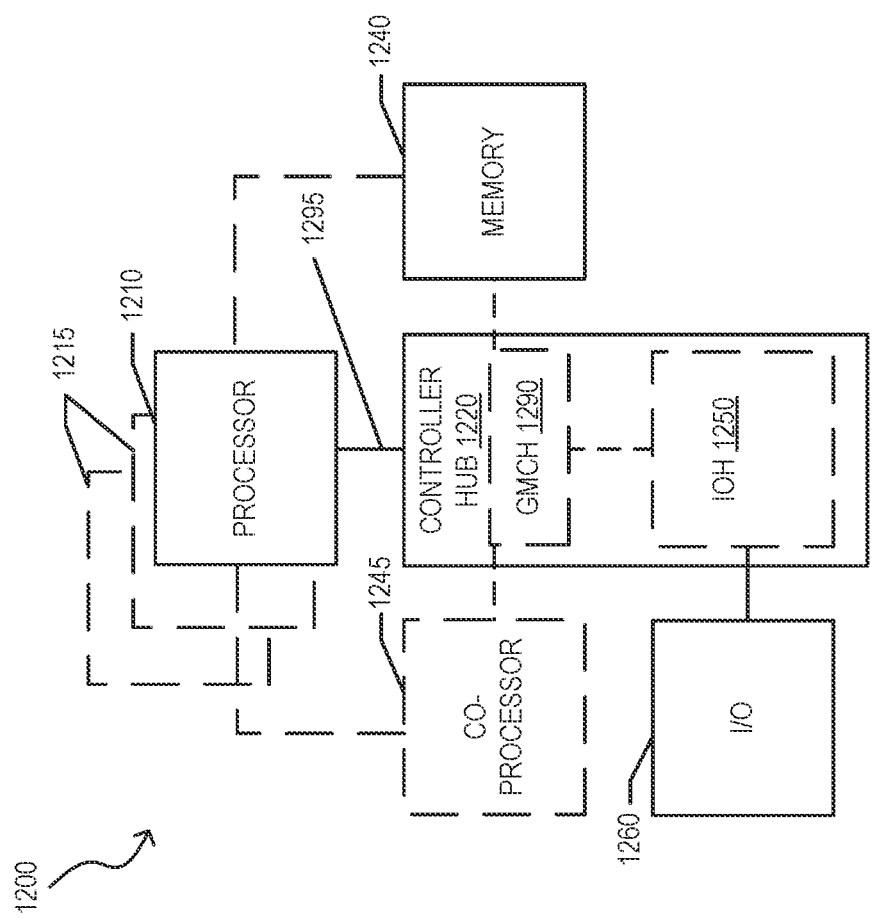
FIG. 5 is a block diagram of a system according to embodiments of the invention.

FIG. 5 is a block diagram of a system 1200 according to embodiments of the invention. The system 1200 may include one or more processors 1210, 1215, which are coupled to a controller hub 1220. In one embodiment, the controller hub 1220 includes a graphics memory controller hub (GMCH) 1290 and an Input/Output Hub (IOH) 1250 (which may be on separate chips); the GMCH 1290 includes a memory controller to control operations within a coupled memory and a graphics controller to which are coupled memory 1240 and a coprocessor 1245; the IOH 1250 couples input/output (I/O) devices 1260 to the GMCH 1290. Alternatively, one or both of the memory and graphics controllers are integrated within the processor, the memory 1240 and the coprocessor 1245 are coupled directly to the processor 1210, and the controller hub 1220 is in a single chip with the IOH 1250.

The optional nature of additional processors 1215 is denoted in FIG. 5 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 6:
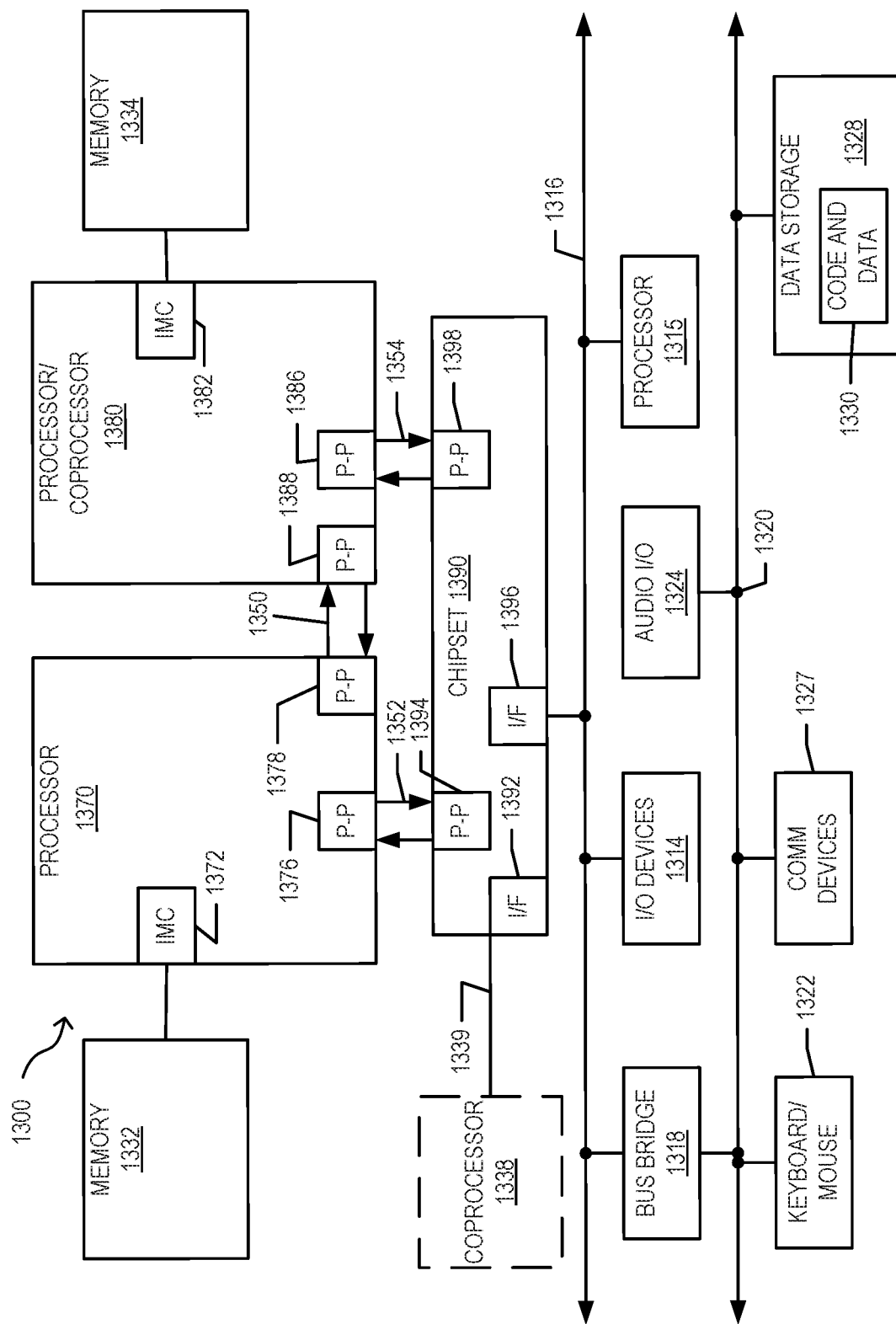
FIGS. 6 and 7 are block diagrams of more specific exemplary systems according to embodiments of the invention.
Figure 7:
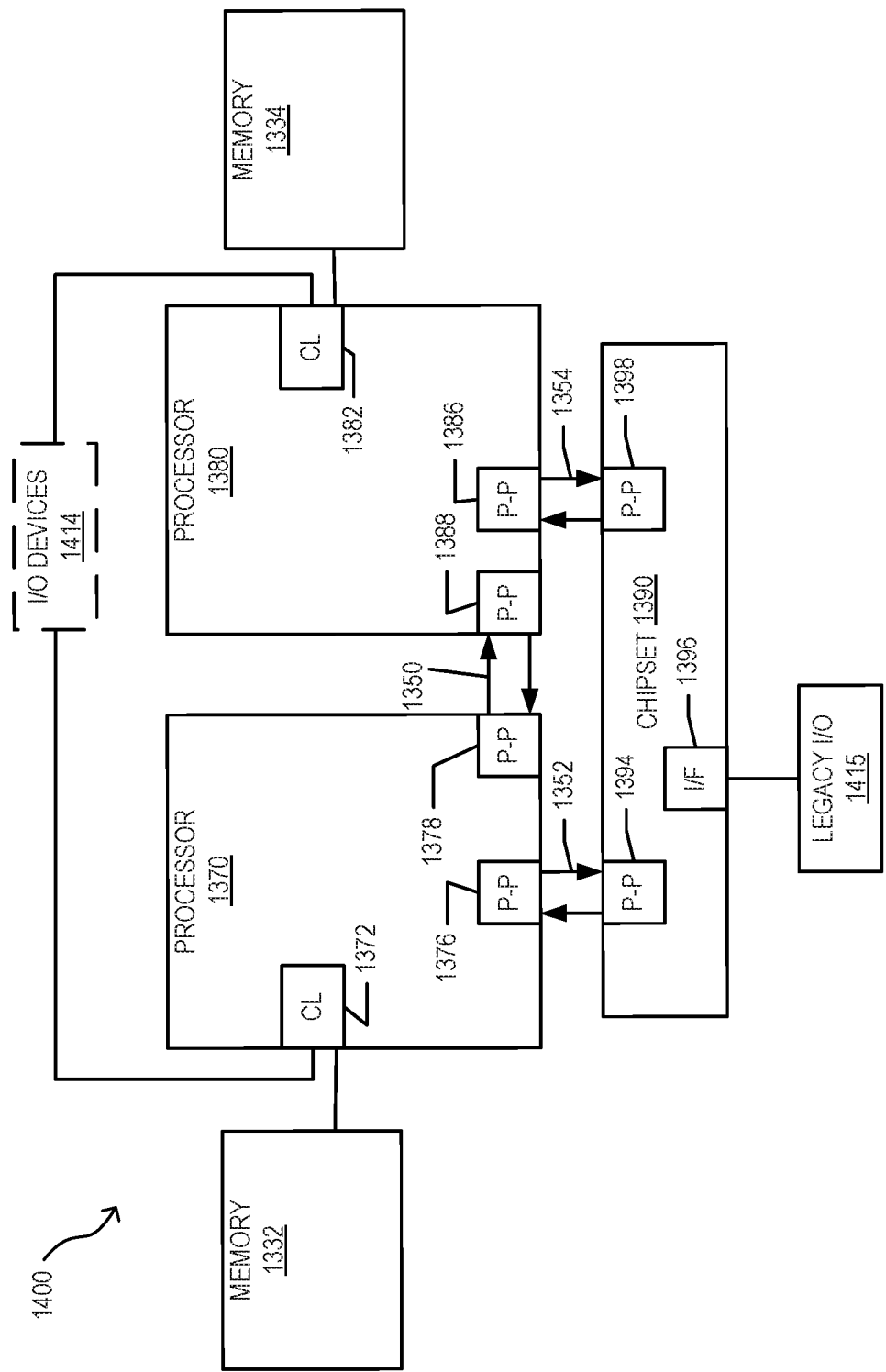

FIGS. 6 and 7 are block diagrams of more specific exemplary systems 1300 and 1400 according to embodiments of the invention. As shown in FIG. 6, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 and coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a P-P interface 1350 using P-P interface circuits 1378, 1388. As shown in FIG. 6, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 6, various I/O devices 1314 may be coupled to first bus 1316, along with a bus bridge 1318 which couples first bus 1316 to a second bus 1320. In one embodiment, one or more additional processors 1315, such as coprocessors, high-throughput MIC processors, GPGPUs, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 6, a system may implement a multi-drop bus or other such architecture.

FIG. 7 presents a block diagram of a second more specific exemplary system 1400 in accordance with an embodiment of the present invention. Certain aspects of FIG. 6 have been omitted from FIG. 7 in order to avoid obscuring other aspects of FIG. 7.

FIG. 7 illustrates that the processors 1370, 1380 may include integrated memory and I/O control logic ("CL") 1372 and 1382, respectively. Thus, the CL 1372, 1382 include integrated memory controller units and include I/O control logic. FIG. 7 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 8:
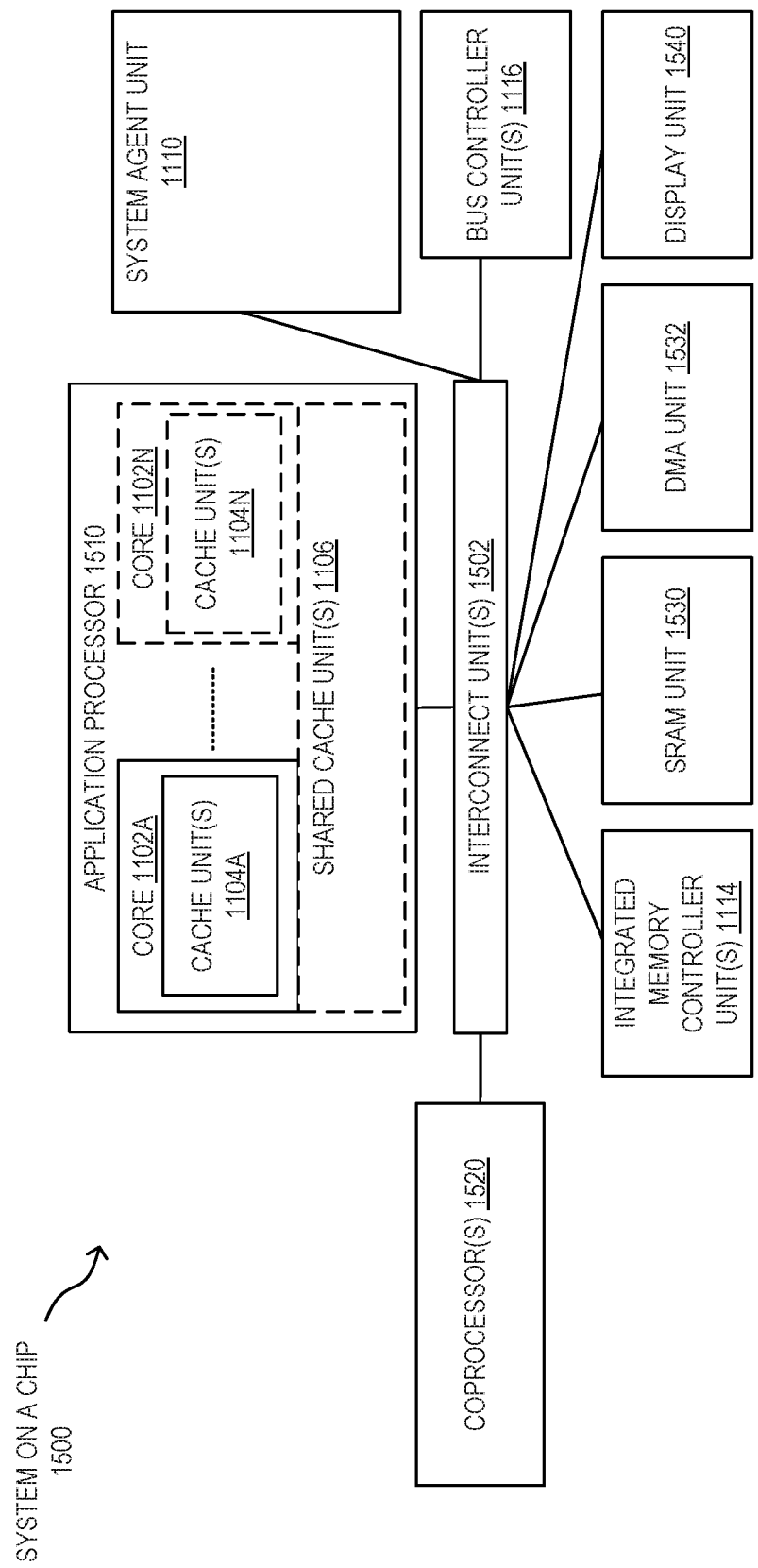
FIG. 8 is a block diagram of a system on a chip according to embodiments of the invention.

FIG. 8 is a block diagram of a system on a chip (SoC) 1500 according to embodiments of the invention. Dashed lined boxes are optional features on more advanced SoCs. In FIG. 8, an interconnect unit(s) 1502 is coupled to: an application processor 1510 which includes a set of one or more cores 1102A-N (including constituent cache units 1104A-N) and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

CONCLUSION

In the present disclosure, expressions such as "an embodiment," "one embodiment," and "another embodiment" are meant to generally reference embodiment possibilities. Those expressions are not intended to limit the invention to particular embodiment configurations. As used herein, those expressions may reference the same embodiment or different embodiments, and those embodiments are combinable into other embodiments. In light of the principles and example embodiments described and illustrated herein, it will be recognized that the illustrated embodiments can be modified in arrangement and detail without departing from the principles described and/or illustrated herein.

Also, according to the present disclosure, a device may include instructions and other data which, when accessed by a processor, cause the device to perform particular operations. For purposes of this disclosure, instructions which cause a device to perform operations may be referred to in general as software. Software and the like may also be referred to as control logic. Software that is used during a boot process may be referred to as firmware. Software that is stored in nonvolatile memory may also be referred to as firmware. Software may be organized using any suitable structure or combination of structures. Accordingly, terms like program and module may be used in general to cover a broad range of software constructs, including without limitation application programs, subprograms, routines, functions, procedures, drivers, libraries, data structures, processes, microcode, and other types of software components. Also, it should be understood that a software module may include more than one component, and those components may cooperate to complete the operations of the module. Also, the operations which the software causes a device to perform may include creating an operating context, instantiating a particular data structure, etc. Embodiments may be implemented as software to execute on a programmable system comprising at least one processor, a storage system (e.g., volatile memory and/or one or more non-volatile storage elements), at least one input device, and at least one output device.

Any suitable operating environment and programming language (or combination of operating environments and programming languages) may be used to implement software components described herein. For example, program code may be implemented in a high-level procedural or object-oriented programming language, or in assembly or machine language. The mechanisms described herein are not limited to any particular programming language. In any case, the language may be a compiled or interpreted language.

A medium which contains data and which allows another component to obtain that data may be referred to as a machine-accessible medium or a machine-readable medium. Accordingly, embodiments may include machine-readable media containing instructions for performing some or all of the operations described herein. Such media may be referred to in general as apparatus and in particular as program products. In one embodiment, software for multiple components is stored in one machine-readable medium. In other embodiments, two or more machine-readable media may be used to store the software for one or more components. For instance, instructions for one component may be stored in one medium, and instructions another component may be stored in another medium. Or a portion of the instructions for one component may be stored in one medium, and the rest of the instructions for that component (as well instructions for other components), may be stored in one or more other media. Similarly, software that is described above as residing on a particular device in one embodiment may, in other embodiments, reside on one or more other devices. For instance, in a distributed environment, some software may be stored locally, and some may be stored remotely. Similarly, operations that are described above as being performed on one particular device in one embodiment may, in other embodiments, be performed by one or more other devices.

Other embodiments may be implemented in data and may be stored on a non-transitory storage medium, which if used by at least one machine, causes the at least one machine to fabricate at least one integrated circuit to perform one or more operations according to the present disclosure. Still further embodiments may be implemented in a computer readable storage medium including information that, when manufactured into an SoC or other processor, is to configure the SoC or other processor to perform one or more operations according to the present disclosure. One or more aspects of at least one embodiment may be implemented by representative instructions, stored on a machine-readable medium, which represent various logic units within the processor, and which, when read by a machine, cause the machine to fabricate logic units to perform the techniques described herein. The instructions representing various logic units may be referred to as "IP cores," and they may be stored on a tangible, machine-readable medium and supplied to various customers or manufacturing facilities to load into the fabrication machines that actually make the logic units or the processor. One or more aspects of at least one embodiment may include machine-readable media containing instructions or design data which defines structures, circuits, apparatuses, processors and/or system features described herein. For instance, design data may be formatted in a hardware description language (HDL).

The machine-readable media for some embodiments may include, without limitation, tangible non-transitory storage components such as magnetic disks, optical disks, magneto-optical disks, dynamic random access memory (RAM), static RAM, read-only memory (ROM), solid state drives (SSDs), phase change memory (PCM), etc., as well as processors, controllers, and other components that include data storage facilities. For purposes of this disclosure, the term "ROM" may be used in general to refer to nonvolatile memory devices such as erasable programmable ROM (EPROM), electrically erasable programmable ROM (EEPROM), flash ROM, flash memory, etc.

It should also be understood that the hardware and software components depicted herein represent functional elements that are reasonably self-contained so that each can be designed, constructed, or updated substantially independently of the others. In alternative embodiments, components may be implemented as hardware, software, or combinations of hardware and software for providing the functionality described and illustrated herein. In some embodiments, some or all of the control logic for implementing the described operations may be implemented in hardware logic (e.g., as microcode in an integrated circuit chip, as a programmable gate array (PGA), as an application-specific integrated circuit (ASIC), etc.). Also, terms such as "circuit" and "circuitry" may be used interchangeably herein. Those terms and terms like "logic" may be used to refer to analog circuitry, digital circuitry, hard-wired circuitry, programmable circuitry, processor circuitry, microcontroller circuitry, hardware logic circuitry, state machine circuitry, any other type of hardware component, or any suitable combination of hardware components.

Additionally, the present teachings may be used to advantage in many different kinds of data processing systems. Such data processing systems may include, without limitation, accelerators, systems on a chip (SoCs), wearable devices, handheld devices, smartphones, telephones, entertainment devices such as audio devices, video devices, audio/video devices (e.g., televisions and set-top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., a PC) should be understood as encompassing other types of data processing systems, as well. A data processing system may also be referred to as an apparatus. The components of a data processing system may also be referred to as apparatus.

Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, ASICs, embedded computers, smart cards, and the like. For purposes of this disclosure, the term "bus" includes pathways that may be shared by more than two devices, as well as point-to-point pathways. Similarly, terms such as "line," "pin," etc. should be understood as referring to a wire, a set of wires, or any other suitable conductor or set of conductors. For instance, a bus may include one or more serial links, a serial link may include one or more lanes, a lane may be composed of one or more differential signaling pairs, and the changing characteristics of the electricity that those conductors are carrying may be referred to as signals on a line. Also, for purpose of this disclosure, the term "processor" denotes a hardware component that is capable of executing software. For instance, a processor may be implemented as a central processing unit (CPU), a processing core, or as any other suitable type of processing element. A CPU may include one or more processing cores, and a device may include one or more CPUs.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

Embodiments include the following examples:

Example A1 is an apparatus comprising a machine-readable medium and instructions in the machine-readable medium which, when executed by a hybrid processor in a data processing system, enable an OS in the data processing system to collect processor topology data from the hybrid processor, wherein the hybrid processor comprises (a) a big TPU that supports a first range of power settings and (b) a small TPU that supports a second range of power settings, wherein the range for the big TPU comprises an upper bound that causes more power consumption than an upper bound of the range for the small TPU. Also, at least one of the TPUs comprises an LP of a processing core that supports SMT. The instructions also enable the OS to collect hardware feedback for at least one of the TPUs from hardware feedback circuitry in the hybrid processor. The instructions also enable the OS to respond to a determination that a thread is ready to be scheduled by utilizing (a) an OP setting for the ready thread, (b) the processor topology data, and (c) the hardware feedback to make a scheduling determination for the ready thread.

Example A2 is an apparatus according to Example A1, wherein the instructions, when executed, further enable the OS to, in response to one of the TPUs going idle, using (a) an OP setting for a running thread, (b) the processor topology data, and (c) the hardware feedback to determine whether or not a running thread should be migrated from an active TPU to the idle TPU.

Example A3 is an apparatus according to Example A1, wherein the operation of making a scheduling determination for the ready thread comprises (i) determining whether the ready thread is more important than a thread that is running on one of the TPUs; (ii) in response to determining that the ready thread is more important, determining whether the TPU with the running thread is more performant than another TPU, based on (a) hardware feedback for the TPU with the running thread and (b) hardware feedback for the other TPU; and (iii) in response to determining that the TPU with the running thread is more performant than the other TPU, preempting the running thread with the ready thread by moving the running thread to the less performant TPU and scheduling the ready thread on the more performant TPU. Example A3 may also include the features of Example A2.

Example A4 is an apparatus according to Example A1, wherein the operation of making a scheduling determination for the ready thread comprises (i) based on the OP setting for the ready thread, determining whether the ready thread has an operating preference for efficiency; (ii) in response to determining that the ready thread has an operating preference for efficiency, using the hardware feedback and the processor topology data to determine whether the hybrid processor comprises an idle TPU that has (a) a relatively high efficiency rating relative to efficiency ratings of other TPUs in the processor and (b) a busy sibling TPU; and (iii) in response to determining that the hybrid processor comprises an idle TPU that has (a) a relatively high efficiency rating and (b) a busy sibling TPU, selecting that idle TPU to receive the ready thread. Example A4 may also include the features of any one or more of Examples A2-A3.

Example A5 is an apparatus according to Example A1, wherein the instructions, when executed, further enable the OS to (i) track running time for important threads running on TPUs other than the big TPU; and (ii) in response to determining that one of the important threads has run on TPUs other than the big TPU for at least a threshold amount of time, schedule that thread on the big TPU. Example A5 may also include the features of any one or more of Examples A2-A4.

Example A6 is an apparatus according to Example A1, wherein the hybrid processor comprises (a) a big core that supports SMT with first and second LPs and (b) a small-core module comprising multiple small cores. Also, the hardware feedback comprises (a) feedback for the first and second LPs in the big core and (b) feedback for the small cores in the small-core module. Also, the big TPU comprises one of the LPs in the big core, and the small TPU comprises one of the small cores in the small-core module. Example A6 may also include the features of any one or more of Examples A2-A5.

Example A7 is an apparatus according to Example A1, wherein the operation of making a scheduling determination for the ready thread comprises (i) based on the OP setting for the ready thread, determining whether the ready thread has an operating preference for QOS; (ii) in response to determining that the ready thread has an operating preference for QOS, using the hardware feedback and the processor topology data to determine whether the hybrid processor comprises an idle TPU that has (a) a relatively high performance rating relative to performance ratings of other TPUs in the processor and (b) no busy sibling TPUs; and (iii) in response to determining that the hybrid processor comprises an idle TPU that has (a) a relatively high performance rating and (b) no busy sibling TPUs, selecting that idle TPU to receive the ready thread. Example A7 may also include the features of any one or more of Examples A2-A6.

Example A8 is an apparatus according to Example A7, wherein, when the small TPU has the relatively high performance rating and no busy sibling TPUs, the instructions cause the OS to select the small TPU to receive the ready thread.

Example A9 is an apparatus according to Example A7, wherein the operation of making a scheduling determination for the ready thread further comprises, in response to determining that the hybrid processor does not comprise an idle TPU that has (a) a relatively high performance rating and (b) no busy sibling TPUs, selecting an idle TPU that has (a) a relatively high performance rating and (b) a busy sibling TPU to receive the ready thread. Example A9 may also include the features of Example A8.

Example B1 is a data processing system with technology for managing threads. The data processing system comprises a hybrid processor comprising (a) a big TPU that supports a first range of power settings, and (b) a small TPU that supports a second range of power settings, wherein the range for the big TPU comprises an upper bound that causes more power consumption than an upper bound of the range for the small TPU, and wherein at least one of the TPUs comprises an LP of a processing core that supports SMT. The hybrid processor further comprises hardware feedback circuitry. The data processing system further comprises a machine-readable medium in communication with the hybrid processor, and instructions in the machine-readable medium which, when executed by the hybrid processor, enable an OS in the data processing system to collect processor topology data from the hybrid processor. The instruction also enable the OS to (i) collect hardware feedback for at least one of the TPUs from the hardware feedback circuitry; and (ii) in response to determining that a thread is ready to be scheduled, utilize (a) an operating-preference (OP) setting for the ready thread, (b) the processor topology data, and (c) the hardware feedback to make a scheduling determination for the ready thread.

Example B2 is a data processing system according to Example B1, wherein the instructions, when executed, further enable the OS to, in response to one of the TPUs going idle, using (a) an OP setting for a running thread, (b) the processor topology data, and (c) the hardware feedback to determine whether or not a running thread should be migrated from an active TPU to the idle TPU.

Example B3 is a data processing system according to Example B1, wherein the operation of making a scheduling determination for the ready thread comprises (i) determining whether the ready thread is more important than a thread that is running on one of the TPUs; (ii) in response to determining that the ready thread is more important, determining whether the TPU with the running thread is more performant than another TPU, based on (a) hardware feedback for the TPU with the running thread and (b) hardware feedback for the other TPU; and (iii) in response to determining that the TPU with the running thread is more performant than the other TPU, preempting the running thread with the ready thread by moving the running thread to the less performant TPU and scheduling the ready thread on the more performant TPU. Example B3 may also include the features of Example B2.

Example B4 is a data processing system according to Example B1, wherein the operation of making a scheduling determination for the ready thread comprises (i) based on the OP setting for the ready thread, determining whether the ready thread has an operating preference for efficiency; (ii) in response to determining that the ready thread has an operating preference for efficiency, using the hardware feedback and the processor topology data to determine whether the hybrid processor comprises an idle TPU that has (a) a relatively high efficiency rating relative to efficiency ratings of other TPUs in the processor and (b) a busy sibling TPU; and (iii) in response to determining that the hybrid processor comprises an idle TPU that has (a) a relatively high efficiency rating and (b) a busy sibling TPU, selecting that idle TPU to receive the ready thread. Example B4 may also include the features of any one or more of Examples B2-B3.

Example B5 is a data processing system according to Example B1, wherein the instructions, when executed, further enable the OS to (i) track running time for important threads running on TPUs other than the big TPU; and (ii) in response to determining that one of the important threads has run on TPUs other than the big TPU for at least a threshold amount of time, schedule that thread on the big TPU. Example B5 may also include the features of any one or more of Examples B2-B4.

Example B6 is a data processing system according to Example B1, wherein the hybrid processor comprises (a) a big core that supports SMT with first and second LPs and (b) a single-threaded small core. Also, the hardware feedback comprises (a) feedback for the first and second LPs in the big core and (b) feedback for the small core. Also, the big TPU comprises one of the LPs in the big core, and the small TPU comprises the small core. Example B6 may also include the features of any one or more of Examples B2-B5.

Example B7 is a data processing system according to Example B1, wherein the hybrid processor comprises (a) a big core that supports SMT with first and second LPs and (b) a small-core module. The small-core module comprises multiple small cores. The hardware feedback comprises (a) feedback for the first and second LPs in the big core and (b) feedback for the small cores in the small-core module. Also, the big TPU comprises one of the LPs in the big core. Example B7 may also include the features of any one or more of Examples B2-B6.

Example B8 is a data processing system according to Example B7, wherein each of the small cores in the small-core module supports SMT with first and second LPs. Also, the small TPU comprises one of the LPs in one of the small cores in the small-core module.

Example B9 is a data processing system according to Example B1, wherein the operation of making a scheduling determination for the ready thread comprises (i) based on the OP setting for the ready thread, determining whether the ready thread has an operating preference for QOS; (ii) in response to determining that the ready thread has an operating preference for QOS, using the hardware feedback and the processor topology data to determine whether the hybrid processor comprises an idle TPU that has (a) a relatively high performance rating relative to performance ratings of other TPUs in the processor and (b) no busy sibling TPUs; and (iii) in response to determining that the hybrid processor comprises an idle TPU that has (a) a relatively high performance rating and (b) no busy sibling TPUs, selecting that idle TPU to receive the ready thread. Example B9 may also include the features of any one or more of Examples B2-B8.

Example B10 is a data processing system according to Example B9, wherein, when the small TPU has the relatively high performance rating and no busy sibling TPUs, the instructions cause the OS to select the small TPU to receive the ready thread.

Example B11 is a data processing system according to Example B9, wherein the operation of making a scheduling determination for the ready thread further comprises, in response to determining that the hybrid processor does not comprise an idle TPU that has (a) a relatively high performance rating and (b) no busy sibling TPUs, selecting an idle TPU that has (a) a relatively high performance rating and (b) a busy sibling TPU to receive the ready thread. Example B11 may also include the features of Example B10.

Example C1 is a method to optimize scheduling of threads in a data processing system with a hybrid processor that comprises (a) a big TPU that supports a first range of power settings, and (b) a small TPU that supports a second range of power settings, wherein the range for the big TPU comprises an upper bound that causes more power consumption than an upper bound of the range for the small TPU, and wherein at least one of the TPUs comprises a logical processor (LP) of a processing core that supports SMT. The method comprises (i) in an OS in the data processing system, collecting processor topology data from the hybrid processor and collecting hardware feedback from hardware feedback circuitry in the hybrid processor; and (ii) in response to determining that a thread is ready to be scheduled, using (a) an OP setting for the ready thread, (b) the processor topology data, and (c) the hardware feedback to make a scheduling determination for the ready thread. Also, the operation of making a scheduling determination for the ready thread comprises (i) based on the OP setting for the ready thread, determining whether the ready thread has an operating preference for QOS; (ii) in response to determining that the ready thread has an operating preference for QOS, using the hardware feedback and the processor topology data to determine whether the hybrid processor comprises an idle TPU that has (a) a relatively high performance rating relative to performance ratings of other TPUs in the processor and (b) no busy sibling TPUs; and (iii) in response to determining that the hybrid processor comprises an idle TPU that has (a) a relatively high performance rating and (b) no busy sibling TPUs, selecting that idle TPU to receive the ready thread.

Example C2 is a method according to Example C1, further comprising, in response to one of the TPUs going idle, using (a) an OP setting for a running thread, (b) the processor topology data, and (c) the hardware feedback to determine whether or not a running thread should be migrated from an active TPU to the idle TPU.

Example C3 is a method according to Example C1, wherein the operation of making a scheduling determination for the ready thread comprises (i) determining whether the ready thread is more important than a thread that is running on one of the TPUs; (ii) in response to determining that the ready thread is more important, determining whether the TPU with the running thread is more performant than another TPU, based on (a) hardware feedback for the TPU with the running thread and (b) hardware feedback for the other TPU; and (iii) in response to determining that the TPU with the running thread is more performant than the other TPU, preempting the running thread with the ready thread by moving the running thread to the less performant TPU and scheduling the ready thread on the more performant TPU. Example C3 may also include the features of Example C2.

Example C4 is a method according to Example C1, further comprising (i) tracking running time for important threads running on TPUs other than the big TPU; and (ii) in response to determining that one of the important threads has run on TPUs other than the big TPU for at least a threshold amount of time, scheduling that thread on the big TPU. Example C4 may also include the features of any one or more of Examples C2-C3.

Example C5 is a method according to Example C1, wherein the operation of making a scheduling determination for the ready thread comprises (i) based on the OP setting for the ready thread, determining whether the ready thread has an operating preference for efficiency; (ii) in response to determining that the ready thread has an operating preference for efficiency, using the hardware feedback and the processor topology data to determine whether the hybrid processor comprises an idle TPU that has (a) a relatively high efficiency rating relative to efficiency ratings of other TPUs in the processor and (b) a busy sibling TPU; and (iii) in response to determining that the hybrid processor comprises an idle TPU that has (a) a relatively high efficiency rating and (b) a busy sibling TPU, selecting that idle TPU to receive the ready thread.

In view of the wide variety of useful permutations that may be readily derived from the example embodiments described herein, this detailed description is intended to be illustrative only, and should not be construed as limiting the scope of coverage.

What is claimed is:

1. An apparatus comprising:
    A non-transitory machine-readable medium; and
    instructions in the machine-readable medium which, when executed by a hybrid processor in a data processing system, enable an operating system (OS) in the data processing system to:
        collect processor topology data from the hybrid processor, wherein the hybrid processor comprises (a) a big thread processing unit (TPU) that supports a first range of power settings, and (b) a small TPU that supports a second range of power settings, wherein the range for the big TPU comprises an upper bound that causes more power consumption than an upper bound of the range for the small TPU, and wherein at least one of the TPUs comprises a logical processor (LP) of a processing core that supports simultaneous multi-threading (SMT);
        collect hardware feedback for at least one of the TPUs from hardware feedback circuitry in the hybrid processor; and
        in response to determining that a thread is ready to be scheduled, utilize (a) an operating-preference (OP) setting for the ready thread, (b) the processor topology data, and (c) the hardware feedback to make a scheduling determination for the ready thread, wherein the operation of making a scheduling determination for the ready thread comprises:
        based on the OP setting for the ready thread, determining whether the ready thread has an operating preference for efficiency or an operating preference for quality of service (QOS);
        in response to determining that the ready thread has an operating preference for efficiency:
            (i) using the hardware feedback and the processor topology data to determine whether the hybrid processor comprises an idle and efficient TPU that has a busy sibling TPU, in that the idle and efficient TPU (a) is idle, (b) has a relatively high efficiency rating relative to efficiency ratings of other TPUs in the processor, and (c) has a sibling TPU that is busy; and
            (ii) in response to determining that the hybrid processor comprises an idle and efficient TPU that has a busy sibling TPU, selecting that idle and efficient TPU that has a busy sibling TPU to receive the ready thread; and
        in response to determining that the ready thread has an operating preference for QOS:
            (i) using the hardware feedback and the processor topology data to determine whether the hybrid processor comprises an idle and performant TPU that has no busy siblings, in that the idle and performant TPU (a) is idle, (b) has a relatively high performance rating relative to performance ratings of other TPUs in the processor and (c) has no busy sibling TPUs; and
            (ii) in response to determining that the hybrid processor comprises an idle and performant TPU that has no busy siblings, selecting that idle and performant TPU that has no busy siblings to receive the ready thread.

2. An apparatus according to claim 1, wherein the instructions, when executed, further enable the OS to:
    in response to one of the TPUs going idle, using (a) an OP setting for a running thread, (b) the processor topology data, and (c) the hardware feedback to determine whether or not a running thread should be migrated from an active TPU to the TPU that went idle.

3. An apparatus according to claim 1, wherein the operation of making a scheduling determination for the ready thread comprises:
    determining whether the ready thread is more important than a thread that is running on one of the TPUs;
    in response to determining that the ready thread is more important, determining whether the TPU with the running thread is more performant than another TPU, based on (a) hardware feedback for the TPU with the running thread and (b) hardware feedback for the other TPU; and in response to determining that the TPU with the running thread is more performant than the other TPU, (a) preempting the running thread with the ready thread by moving the running thread to the less performant TPU and (b) scheduling the ready thread on the more performant TPU.

4. An apparatus according to claim 1, wherein the instructions, when executed, further enable the OS to:
track running time for important threads running on TPUs other than the big TPU; and
in response to determining that one of the important threads has run on one or more TPUs other than the big TPU for at least a threshold amount of time, schedule that thread on the big TPU.

5. An apparatus according to claim 4, wherein the instructions, when executed, further enable the OS to:
provide for different classes of important threads, including a more important class for more important threads and a less important class for less important threads;
assign a shorter threshold for threads in the more important class; and
assign a longer threshold for threads in the less important class.

6. An apparatus according to claim 1, wherein:
the hybrid processor comprises (a) a big core that supports SMT with first and second LPs and (b) a small-core module comprising multiple small cores;
the hardware feedback comprises (a) feedback for the first and second LPs in the big core and (b) feedback for the small cores in the small-core module;
the big TPU comprises one of the LPs in the big core; and
the small TPU comprises one of the small cores in the small-core module.

7. An apparatus according to claim 1, wherein, when (a) the ready thread has an operating preference for QOS and (b) the small TPU is the idle and performant TPU that has no busy siblings, the instructions cause the OS to select the small TPU to receive the ready thread.

8. An apparatus according to claim 1, wherein, when the ready thread has an operating preference for QOS, the operation of making a scheduling determination for the ready thread further comprises:
in response to determining that the hybrid processor does not comprise an idle and performant TPU that has no busy siblings, selecting an idle TPU that has (a) a relatively high performance rating and (b) a busy sibling TPU to receive the ready thread.

9. A data processing system with technology for managing threads, the data processing system comprising:
a hybrid processor comprising (a) a big thread processing unit (TPU) that supports a first range of power settings, and (b) a small TPU that supports a second range of power settings, wherein the range for the big TPU comprises an upper bound that causes more power consumption than an upper bound of the range for the small TPU, and wherein at least one of the TPUs comprises a logical processor (LP) of a processing core that supports simultaneous multi-threading (SMT);
hardware feedback circuitry in the hybrid processor;
a non-transitory machine-readable medium in communication with the hybrid processor; and
instructions in the machine-readable medium which, when executed by the hybrid processor, enable an operating system (OS) in the data processing system to:
collect processor topology data from the hybrid processor;
collect hardware feedback for at least one of the TPUs from the hardware feedback circuitry; and
in response to determining that a thread is ready to be scheduled, utilize (a) an operating-preference (OP) setting for the ready thread, (b) the processor topology data, and (c) the hardware feedback to make a scheduling determination for the ready thread, wherein the operation of making a scheduling determination for the ready thread comprises:
based on the OP setting for the ready thread, determining whether the ready thread has an operating preference for efficiency or an operating preference for quality of service (QOS);
in response to determining that the ready thread has an operating preference for efficiency:
(i) using the hardware feedback and the processor topology data to determine whether the hybrid processor comprises an idle and efficient TPU that has a busy sibling TPU, in that the idle and efficient TPU (a) is idle, (b) has a relatively high efficiency rating relative to efficiency ratings of other TPUs in the processor, and (c) has a sibling TPU that is busy; and
(ii) in response to determining that the hybrid processor comprises an idle and efficient TPU that has a busy sibling TPU, selecting that idle and efficient TPU that has a busy sibling TPU to receive the ready thread; and
in response to determining that the ready thread has an operating preference for QOS:
(i) using the hardware feedback and the processor topology data to determine whether the hybrid processor comprises an idle and performant TPU that has no busy siblings, in that the idle and performant TPU (a) is idle, (b) has a relatively high performance rating relative to performance ratings of other TPUs in the processor and (c) has no busy sibling TPUs; and
(ii) in response to determining that the hybrid processor comprises an idle and performant TPU that has no busy siblings, selecting that idle and performant TPU that has no busy siblings to receive the ready thread.

10. A data processing system according to claim 9, wherein the instructions, when executed, further enable the OS to:
in response to one of the TPUs going idle, using (a) an OP setting for a running thread, (b) the processor topology data, and (c) the hardware feedback to determine whether or not a running thread should be migrated from an active TPU to the TPU that went idle.

11. A data processing system according to claim 9, wherein the operation of making a scheduling determination for the ready thread comprises:
determining whether the ready thread is more important than a thread that is running on one of the TPUs;
in response to determining that the ready thread is more important, determining whether the TPU with the running thread is more performant than another TPU, based on (a) hardware feedback for the TPU with the running thread and (b) hardware feedback for the other TPU; and
in response to determining that the TPU with the running thread is more performant than the other TPU, (a) preempting the running thread with the ready thread by moving the running thread to the less performant TPU and (b) scheduling the ready thread on the more performant TPU.

12. A data processing system according to claim 9, wherein the instructions, when executed, further enable the OS to:
    track running time for important threads running on TPUs other than the big TPU; and
    in response to determining that one of the important threads has run on one or more TPUs other than the big TPU for at least a threshold amount of time, schedule that thread on the big TPU.

13. A data processing system according to claim 12, wherein the instructions, when executed, further enable the OS to:
    provide for different classes of important threads, including a more important class for more important threads and a less important class for less important threads;
    assign a shorter threshold for threads in the more important class; and
    assign a longer threshold for threads in the less important class.

14. A data processing system according to claim 9, wherein:
    the hybrid processor comprises (a) a big core that supports SMT with first and second LPs and (b) a single-threaded small core;
    the hardware feedback comprises (a) feedback for the first and second LPs in the big core and (b) feedback for the small core;
    the big TPU comprises one of the LPs in the big core; and
    the small TPU comprises the small core.

15. A data processing system according to claim 9, wherein:
    the hybrid processor comprises (a) a big core that supports SMT with first and second LPs and (b) a small-core module;
    the small-core module comprises multiple small cores;
    the hardware feedback comprises (a) feedback for the first and second LPs in the big core and (b) feedback for the small cores in the small-core module; and
    the big TPU comprises one of the LPs in the big core.

16. A data processing system according to claim 15, wherein:
    each of the small cores in the small-core module supports SMT with first and second LPs; and
    the small TPU comprises one of the LPs in one of the small cores in the small-core module.

17. A data processing system according to claim 9, wherein, when (a) the ready thread has an operating preference for QOS and (b) the small TPU is the idle and performant TPU that has no busy siblings, the instructions cause the OS to select the small TPU to receive the ready thread.

18. A data processing system according to claim 9, wherein, when the ready thread has an operating preference for QOS, the operation of making a scheduling determination for the ready thread further comprises:
    in response to determining that the hybrid processor does not comprise an idle and performant TPU that has no busy siblings, selecting an idle TPU that has (a) a relatively high performance rating and (b) a busy sibling TPU to receive the ready thread.

19. An apparatus comprising:
    A non-transitory machine-readable medium; and
    instructions in the machine-readable medium which, when executed by a hybrid processor in a data processing system, enable an operating system (OS) in the data processing system to:
        collect processor topology data from the hybrid processor, wherein the hybrid processor comprises (a) a big thread processing unit (TPU) that supports a first range of power settings, and (b) a small TPU that supports a second range of power settings, wherein the range for the big TPU comprises an upper bound that causes more power consumption than an upper bound of the range for the small TPU, and wherein at least one of the TPUs comprises a logical processor (LP) of a processing core that supports simultaneous multi-threading (SMT);
        collect hardware feedback for at least one of the TPUs from hardware feedback circuitry in the hybrid processor;
        in response to determining that a thread is ready to be scheduled, utilize (a) an operating-preference (OP) setting for the ready thread, (b) the processor topology data, and (c) the hardware feedback to make a scheduling determination for the ready thread;
        track running time for important threads running on TPUs other than the big TPU; and
        in response to determining that one of the important threads has run on one or more TPUs other than the big TPU for at least a threshold amount of time, schedule that thread on the big TPU.

20. An apparatus according to claim 19, wherein the instructions, when executed, further enable the OS to:
    provide for different classes of important threads, including a more important class for more important threads and a less important class for less important threads;
    assign a shorter threshold for threads in the more important class; and
    assign a longer threshold for threads in the less important class.

21. An apparatus according to claim 20, wherein the operation of making a scheduling determination for the ready thread comprises:
    based on the OP setting for the ready thread, determining whether the ready thread has an operating preference for efficiency or an operating preference for quality of service (QOS);
    in response to determining that the ready thread has an operating preference for efficiency:
        (i) using the hardware feedback and the processor topology data to determine whether the hybrid processor comprises an idle and efficient TPU that has a busy sibling TPU, in that the idle and efficient TPU (a) is idle, (b) has a relatively high efficiency rating relative to efficiency ratings of other TPUs in the processor, and (c) has a sibling TPU that is busy; and
        (ii) in response to determining that the hybrid processor comprises an idle and efficient TPU that has a busy sibling TPU, selecting that idle and efficient TPU that has a busy sibling TPU to receive the ready thread; and
    in response to determining that the ready thread has an operating preference for QOS:
        (i) using the hardware feedback and the processor topology data to determine whether the hybrid processor comprises an idle and performant TPU that has no busy siblings, in that the idle and performant TPU (a) is idle, (b) has a relatively high performance rating relative to performance ratings of other TPUs in the processor and (c) has no busy sibling TPUs; and (ii) in response to determining that the hybrid processor comprises an idle and performant TPU that has no busy siblings, selecting that idle and performant TPU that has no busy siblings to receive the ready thread.

\* \* \* \* \*